US012709581B2

(12) United States Patent
Magnant et al.

(10) Patent No.: US 12,709,581 B2
(45) Date of Patent: Aug. 18, 2026

(54) METHOD FOR REPAIRING CERAMIC COMPOSITE COMPONENTS

(71) Applicant: General Electric Company, Schenectady, NY (US)

(72) Inventors: Jerome Geoffrey Magnant, Rexford, NY (US); Henry Charles McGuigan, Duanesburg, NY (US); Jared Hogg Weaver, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 59 days.

(21) Appl. No.: 18/591,623

(22) Filed: Feb. 29, 2024

(65) Prior Publication Data

US 2025/0276941 A1 Sep. 4, 2025

(51) Int. Cl.

| | |
|---|---|
| ***C04B 41/45*** | (2006.01) |
| ***B33Y 80/00*** | (2015.01) |
| ***C04B 35/80*** | (2006.01) |
| ***C04B 41/87*** | (2006.01) |

(52) U.S. Cl.

CPC .......... *C04B 41/4596* (2013.01); *B33Y 80/00* (2014.12); *C04B 35/80* (2013.01); *C04B 41/87* (2013.01)

(58) Field of Classification Search

CPC ..... C04B 41/4596; C04B 41/87; C04B 35/80; B33Y 80/00

USPC ........................................................... 156/98

See application file for complete search history.

(56) References Cited

U.S. PATENT DOCUMENTS

| | | | |
|---|---|---|---|
| 4,762,269 | A | 8/1988 | Gyarmati et al. |
| 5,975,407 | A | 11/1999 | Grasse et al. |
| 6,503,441 | B2 | 1/2003 | Corman et al. |
| 6,820,334 | B2 | 11/2004 | Kebbede et al. |
| 7,318,547 | B2 | 1/2008 | Gasse |
| 7,500,833 | B2 | 3/2009 | Bublath et al. |
| 7,888,277 | B2 | 2/2011 | Riedell et al. |
| 8,939,728 | B2 | 1/2015 | McCaffrey et al. |
| 9,132,619 | B2 | 9/2015 | Khalifa et al. |
| 9,527,170 | B2 | 12/2016 | Czerner |
| 9,545,774 | B1 | 1/2017 | Heng et al. |

(Continued)

OTHER PUBLICATIONS

Ferraris et al., Glass Ceramic Coating and Joining of SiC/SiC for Fusion Applications, Journal of Nuclear Materials, ISSN 0022-3115, vol. 258-263 (pt.B), 1998, pp. 1546-1550. (Abstract Only) https://inis.iaea.org/search/search.aspx?orig_q=RN:30007648.

(Continued)

*Primary Examiner* — James D Sells
(74) *Attorney, Agent, or Firm* — Dority & Manning, P.A.

(57) ABSTRACT

A method for repairing a component that comprises a ceramic matrix composite ("CMC") material includes forming a repair insert defined by a repair geometry where the repair geometry is based on a repair area of the component, and the repair insert comprises a monolithic ceramic. Inserting the repair insert into the repair area and applying a CMC face sheet to the repair insert. The method further includes bonding the repair insert to the CMC face sheet, the repair insert to the component, and the CMC face sheet to the component. The method also includes thermally processing and densifying at least one of the repair insert or the CMC face sheet in the repair area.

20 Claims, 10 Drawing Sheets

(56) References Cited

U.S. PATENT DOCUMENTS

| | | | |
|---|---|---|---|
| 9,573,852 B2 | 2/2017 | Revel et al. | |
| 9,624,786 B2 | 4/2017 | Xu et al. | |
| 9,745,849 B2 | 8/2017 | Hardwicke et al. | |
| 10,093,586 B2 | 10/2018 | Luthra et al. | |
| 10,150,188 B1 | 12/2018 | Parolini et al. | |
| 10,370,301 B2 | 8/2019 | Chamberlain et al. | |
| 10,406,640 B2 | 9/2019 | Harris | |
| 10,723,660 B2 | 7/2020 | Kirby | |
| 10,814,439 B2 | 10/2020 | Ozturk et al. | |
| 10,822,281 B2 | 11/2020 | She et al. | |
| 10,834,790 B2 | 11/2020 | Harris | |
| 10,946,600 B1 | 3/2021 | Hundley et al. | |
| 10,947,162 B2 | 3/2021 | Nelson et al. | |
| 11,027,351 B2 | 6/2021 | Landwehr et al. | |
| 11,459,908 B2 | 10/2022 | Decesare et al. | |
| 11,504,813 B2 | 11/2022 | Whittle et al. | |
| 11,548,102 B2 | 1/2023 | Roberts et al. | |
| 12,281,598 B1 * | 4/2025 | Ugarte | B29C 70/84 |
| 2008/0190552 A1 | 8/2008 | Bouillon et al. | |
| 2008/0226868 A1 | 9/2008 | Pickering et al. | |
| 2012/0177488 A1 | 7/2012 | Corman | |
| 2013/0205554 A1 | 8/2013 | Czerner | |
| 2016/0229758 A1 | 8/2016 | Kmetz et al. | |
| 2019/0040742 A1 | 2/2019 | Roberts et al. | |
| 2019/0338660 A1 | 11/2019 | Underwood et al. | |
| 2019/0376389 A1 | 12/2019 | Roberts et al. | |
| 2020/0181029 A1 | 6/2020 | Clerambourg et al. | |
| 2020/0308066 A1 | 10/2020 | Shiang et al. | |
| 2021/0024427 A1 | 1/2021 | Liliedahl et al. | |
| 2021/0147303 A1 | 5/2021 | Bortoluzzi et al. | |
| 2021/0155553 A1 | 5/2021 | Lenz | |
| 2021/0262354 A1 | 8/2021 | McCaffrey et al. | |
| 2021/0276925 A1 | 9/2021 | Shi et al. | |
| 2022/0032408 A1 | 2/2022 | Roberts et al. | |
| 2022/0136395 A1 | 5/2022 | Ozbaysal et al. | |
| 2022/0234101 A1 | 7/2022 | Ozbaysal et al. | |
| 2022/0402031 A1 | 12/2022 | Hann et al. | |

OTHER PUBLICATIONS

Griel, Polymer Derived Engineering Ceramics, Advanced Engineering Materials, 2000, vol. 2, Issue 6, pp. 339-348. (Abstract Only) https://doi.org/10.1002/1527-2648(200006)2:6<339::AID-ADEM339>3.0.CO;2-K.

Koyanagi et al., Irradiation Resistance of Silicon Carbide Joint at Light Water Reactor-Relevant Temperature, U.S Department of Energy, 21 Pages. https://www.osti.gov/pages/servlets/purl/1347314.

Lewinsohn et al., Silicon Carbide-Based Materials for Joining Silicon Carbide Composites for Fusion Energy Applications, Journal of Nuclear Materials, vols. 307-311, Part 2, Dec. 2002, pp. 1232-1236. (Abstract Only) https://www.sciencedirect.com/science/article/abs/pii/S0022311502010632.

Liu et al., Recent Advances in Joining of SiC-Based Materials (Monolithic SiC and $SiC_f$ /SiC Composites): Joining Processes, Joint Strength, and Interfacial Behavior, ISSN 2226-4108, Journal of Advanced Ceramics, vol. 8, No. 1, 2019, pp. 19-38. https://doi.org/10.1007/s40145-018-0297-x.

Yoon et al., A Review on the Joining of SiC for High-Temperature Applications, Journal of the Korean Ceramic Society 2020, vol. 57, 2020, pp. 246-270. https://doi.org/10.1007/s43207-020-00021-4.

Zhang et al., Joining of Cf/SiC Ceramic Matrix Composites: A Review, Hindawi Advances in Materials Scient and Engineering, vol. 2018, Article ID 6176054, 16 Pages. https://doi.org/10.1155/2018/6176054.

* cited by examiner 280
292
294
294
292
288
290

METHOD FOR REPAIRING CERAMIC COMPOSITE COMPONENTS

FIELD

The present subject matter relates generally to a method for repairing ceramic components and, more particularly to a method for repairing ceramic composite components.

BACKGROUND

Reinforced ceramic matrix composites ("CMCs") comprising fibers dispersed in continuous ceramic matrices of the same or a different composition are well suited for structural applications because of their toughness, thermal resistance, high-temperature strength, and chemical stability. Such composites typically have high strength-to-weight ratio that renders them attractive in applications in which weight is a concern, such as in aeronautic applications. Their stability at high temperatures renders them very suitable in applications in which the components are in contact with a high-temperature gas, such as in gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

DETAILED DESCRIPTION

Figure 1:
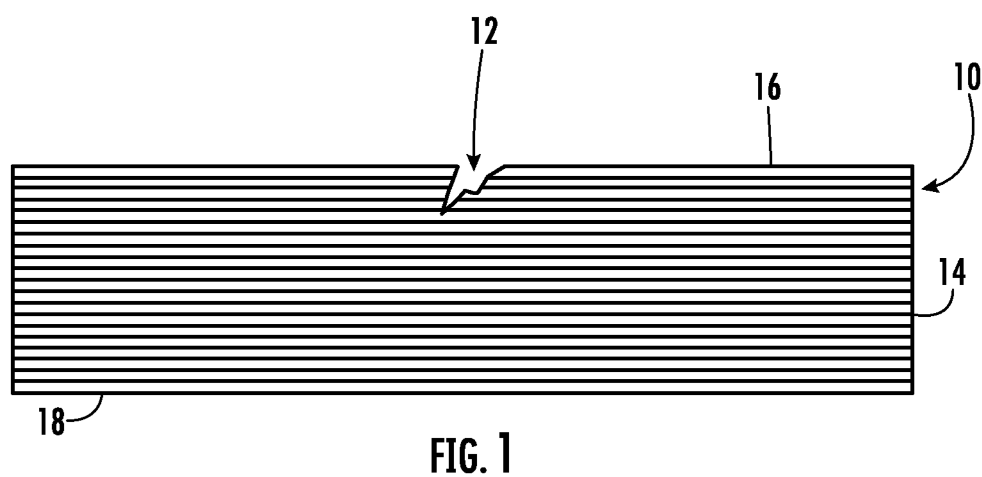
FIG. 1 is a schematic, side view of an exemplary ceramic composite component in accordance with an embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof. Those fibers can be continuous fibers or short fibers like whiskers.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3$ $2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or pyrolysis/burn-out to yield a high char residue in the preform, and subsequent chemical processing, such as melt-infiltration with, for example, silicon or a silicon alloy, to arrive at a component formed of a CMC material having a desired chemical composition. Chemical vapor infiltration (CVI) may also be used to fabricate the preform such that a gaseous source of silicon or a silicon alloy is used to infiltrate pores of the cured preform to arrive at a component formed of a CMC material having a desired chemical composition. Other methods may also be used to form the preform component such as, by way of non-limiting example, polymer infiltration and pyrolysis (PIP).

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, nozzles, transition ducts, thermal protection systems (TPS), aerodynamic control surfaces and leading edges that would benefit from the lighter-weight and higher temperature capability these materials can offer.

In exemplary embodiments, the present disclosure provides a method and system for repairing a ceramic matrix composite component. The method includes removing a portion of the original material of the component to remove the non-conforming or damaged area of the component and define a repair area for the component. A non-conforming area of the component may be an area of a component that does not meet a particular specification for the component. A damaged area of the component may be an area of the component that has been damaged (e.g., damaged during or after formation, such as in service). A ceramic repair insert is fabricated corresponding to a repair geometry of the component defined by the removed material in the repair area. In exemplary embodiments, the repair insert is fabricated using additive manufacturing techniques corresponding to a three-dimensional shape of the repair area. The three-dimensional shape of the repair area may be determined using three-dimensional scanning techniques, preparing a mold of the repair area, or otherwise. The repair insert is placed into the repair area and covered with a CMC face sheet. In exemplary embodiments, the repair insert and the CMC face sheet are bonded/consolidated together and to the component by heat treatment, and then one or more of the repair insert and the CMC face sheet are thermally and chemically processed (e.g., pyrolysis and melt-infiltration, or chemical vapor infiltration (CVI)) with the component.

Accordingly, embodiments of the present disclosure provide a method and technique for repairing a ceramic matrix composite component using a hybrid structural repair (e.g., a monolithic ceramic repair insert with a CMC face sheet). Exemplary embodiments of the present disclosure utilize an additive manufacturing process to fabricate the repair insert to accommodate complex repair area shapes and tailor the repair insert to the specific repair geometry of the component. Additionally, the repair insert and CMC face sheet are formed of materials corresponding to the material properties of the component being repaired providing better thermomechanical properties of the component and less differential shrinkage between the constituents of the repair components during fabrication and utilization. In embodiments, the ceramic repair insert may be made of CMC. The CMC repair insert can be densified prior to introduction in the repair area or densified after introduction in the repair area. The densification of the CMC repair insert can be accomplished by a process such as melt-infiltration (e.g., using silicon or silicon alloy melt-infiltration), chemical vapor infiltration (CVI), polymer impregnation and pyrolysis (PIP), or a combination of such processes. A CMC face sheet can be applied on top of the CMC repair insert as in the case of a monolithic ceramic insert.

In the present disclosure, when a layer is being described as "above one another," "on," or "over" another layer or substrate, it is to be understood that the layers can be directly contacting each other. Thus, these terms are simply describing the relative position of the layers to each other and do not necessarily mean "on top of" since the relative position above or below depends upon the orientation of the device to the viewer.

As used herein a "monolithic" ceramic insert refers to a ceramic material that does not contain any continuous reinforcement fibers but may contain short or non-continuous fibers like chopped carbon fibers or chopped ceramic fibers.

As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology or a selective laser melting (SLM) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components. In some cases additively manufactured ceramic objects can contain short fibers like carbon or ceramic whiskers as reinforcement.

Additionally or alternatively suitable additive manufacturing technologies may include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes. Additive manufacturing processes fabricate components using three-dimensional (3D) information, for example a three-dimensional computer model, of the component. Accordingly, a three-dimensional design model of the component may be defined prior to manufacturing, such as by using a suitable computer aided design (CAD) program to define the three-dimensional design model of the component.

The additive manufacturing processes described herein may be used for forming components using any suitable material. For example, the material may be ceramic or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include high-temperature ceramics, or precursors for high-temperature ceramics, such as polymeric precursors. Each successive layer may be, for example, between about 10 μm and 300 μm, although the thickness may be determined based on any number of parameters and may be any suitable size.

Embodiments of the present disclosure provide a system and method for repairing a CMC structure (e.g., used for high-temperature, high-specific-stiffness, applications or other applications). Embodiments of the present disclosure may be used for repairing a component having one or more portions that are CMC sandwich structure or one or more portions that are a non-sandwich CMC structure. A CMC sandwich structure is a layered structure formed by bonding two thin ceramic face sheets to a thick ceramic core. In exemplary embodiments, a CMC sandwich structure may include a monolithic ceramic core structure configured for multiple functionalities (e.g., specific stiffness (stiffness to mass), thermal management of the structure in combined loading and thermal gradient vs. surface temperature, or internal cooling of a high temperature structure). CMC layers are laminated to the monolithic ceramic core structure. The monolithic ceramic core structure may be printed, machined or fabricated by other known means using a monolithic ceramic as a single- or multi-segmented core to achieve an overall aerodynamic structure. The core or the core segments may include regions of or features for integration and joining with CMC plies and elements within the structure for enhanced functional performance and reliability. For example, in exemplary embodiments, a single-piece monolithic ceramic core may include: pockets and interlocking features for internal attachment or for placement of CMC plies or CMC inserts; aerodynamically shaped leading edges with interior edges for CMC face sheet ply arrangements; a backbone skeleton of differently shaped walls to manage local structural rigidity; and mating features to accommodate joining with the monolithic ceramic core structure. A non-sandwich CMC structure may be a structure formed of only layers of CMC plies or, in other words, a solid CMC laminate structure without a core. In other words, a non-sandwich CMC structure does not contain a ceramic core of usually lower density as in a CMC sandwich structure. Accordingly, embodiments of the present disclosure provide a system and method for repairing a sandwich or a non-sandwich CMC structure using a hybrid structural repair (e.g., a monolithic ceramic repair insert with one or more CMC face sheets). At least in the case of non-sandwich CMC structures, embodiments of the present disclosure enable non-sandwich CMC structures to be repaired with the hybrid structural repair approach of the present disclosure and meet the thermomechanical performance requirement of the original non-sandwich CMC structure.

Referring now to the figures, wherein identical numerals indicate the same elements throughout the figures, FIG. 1 is a schematic diagram depicting a component 10 comprising a damaged area 12 in accordance with an embodiment of the present disclosure. Although the description in connection with FIG. 1 and other figures of the present disclosure may be in the context of a "damaged" area, it should be understood that embodiments of the present disclosure are also applicable for repairing non-conforming areas of a component. In the illustrated embodiment, at least a portion of the component 10 comprises a CMC material in the form of a layup or stacked arrangement of CMC plies 14 such that the portion of component 10 being repaired comprises a non-sandwich CMC structure. However, it should be understood that the component 10 may comprise additional or other types of materials (e.g., a cellular structure, such as a foam or honeycomb structure, in combination with CMC plies, such as a CMC sandwich structure) or be a non-sandwich CMC structure in its entirety. In the illustrated embodiment, the component 10 comprises a top surface 16 and a bottom surface 18 opposite the top surface 16, and the damaged area 12 resides on the top surface 16 of the component 10. However, it should be understood that the damaged area 12 may reside on one or more other surfaces of the component 10 or may be internally located in the component 10.

Figure 2:
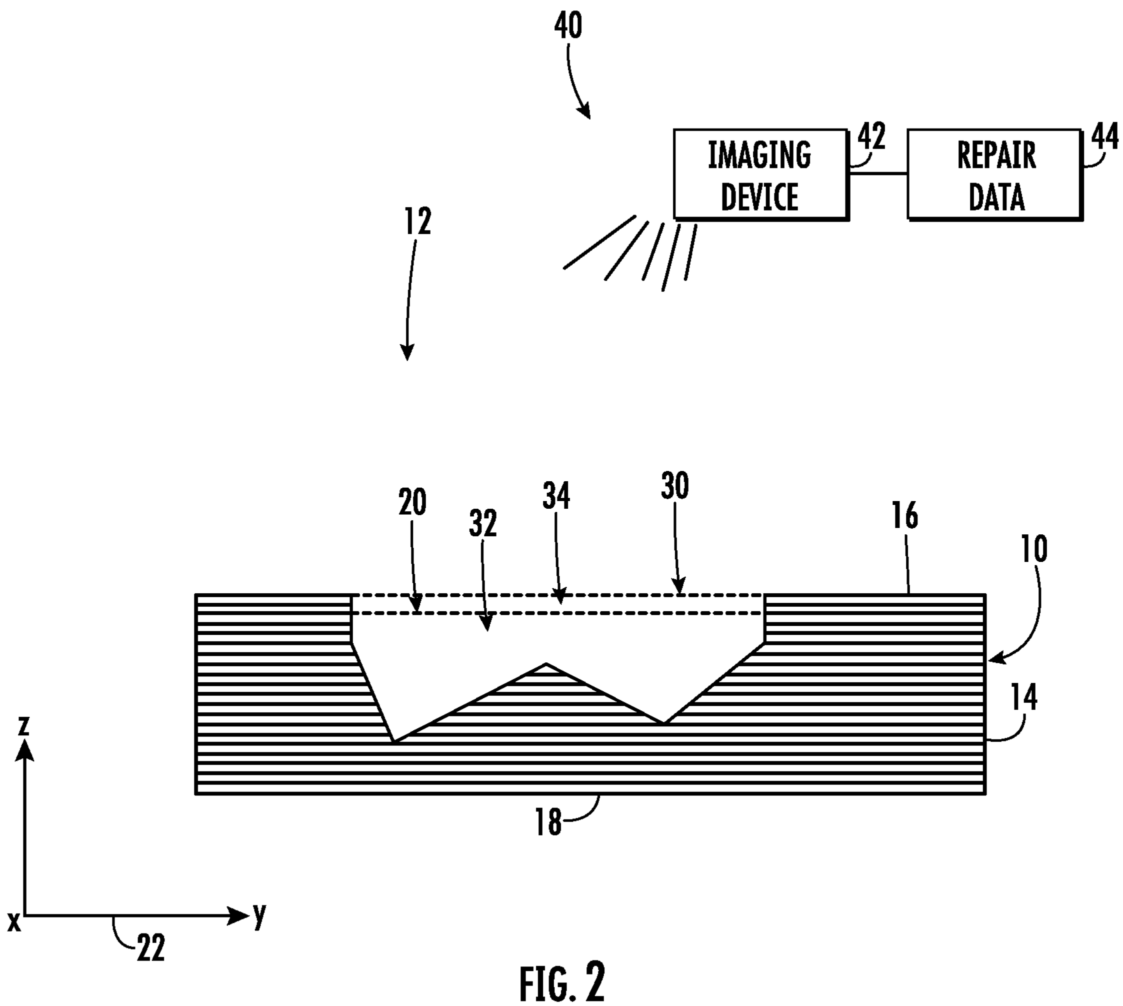
FIG. 2 is a schematic, side view of the exemplary ceramic composite component of FIG. 1 undergoing a repair in accordance with an embodiment of the present disclosure.

FIG. 2 is a schematic diagram depicting the component 10 being repaired in accordance with an embodiment of the present disclosure. In the illustrated embodiment, the damaged area 12 (FIG. 1) of the component 10 has been removed to define a repair area 20 in the component 10. For example, in exemplary embodiments, the component 10 may be cut, ground, machined, or otherwise processed to remove material from the component 10 encompassing the damaged area 12 (FIG. 1) to define the repair area 20. In the illustrated embodiment, one or more of the CMC plies 14 have been cut or machined away from the component 10 extending in a direction inwardly from the top surface 16 (e.g., in the direction of the Z axis as indicated via a coordinate system 22) to remove the damaged area 12 (FIG. 1) (and although not readily visible in FIG. 2, also extending laterally in the direction of the X and Y axes as indicated via the coordinate system 22). The lateral and depth (or amount) of material removed from the component 10 to remove the damaged area 12 (FIG. 1) and define the repair area 20 may vary depending on the extent of the damaged area 12 (FIG. 1). For example, in exemplary embodiments, the lateral and depth (or amount) of material removed from the component 10 to encompass and remove the damaged area 12 (FIG. 1) and define the repair area 20 may be to sufficiently expose non-damaged portions of the component 10 or to sufficiently expose a certain surface area for receiving repair materials (s). Alternately or additionally, the repair area 20 may correspond to a predefined three-dimensional space or volume corresponding to a predefined repair material or component. For example, in exemplary embodiments, a repair material or component may comprise a prefabricated material or component having a predefined shape or volume usable in a variety of different repairs such that the repair area 20 is sized or configured to match the predefined repair material or component.

In exemplary embodiments, the repair area 20 defines a repair geometry 30 comprising a three-dimensional space or volume for receiving one or more repair materials or components in the repair area 20. The repair geometry 30 may comprise the entire repair area 20 space or a portion of the repair area 20 space corresponding to certain repair materials or components to be disposed within the repair area 20. For example, in exemplary embodiments, the repair geometry 30 may comprise a first repair geometry 32 encompassing a first portion of the repair area 20 space (e.g., a lower portion of the repair area 20 space) and a second repair geometry 34 encompassing a second portion of the repair area 20 space (e.g., an upper portion of the repair area 20 space). However, it should be understood that the quantity or position of different spaces or volumes encompassing the repair geometry 30 may vary.

In exemplary embodiments, a system 40 for repairing the component 10 comprises an imaging device 42 configured to obtain three-dimensional data corresponding to the repair geometry 30. For example, the imaging device 42 may comprise a scanner, X-ray device, or other type of optical imaging device configured to obtain, acquire, or generate three-dimensional data corresponding to the repair area 20 and corresponding repair geometry 30. In the illustrated embodiment, the output or three-dimensional data obtained or generated by the imaging device 42 corresponding to the repair area 20 and corresponding repair geometry 30 comprises repair data 44. As will be described in greater detail below, the repair data 44 may be used as build data for manufacturing one or more repair materials or components to be inserted into the repair area 20 of the component 10. Additionally or alternatively, the repair data 44 may be generated via standard drawing techniques. Additionally or alternatively, a mold may be created corresponding to the repair area 20 to obtain three-dimensional data corresponding to the repair geometry 30. The mold then may be used to create or fabricate one or more repair materials or components to be inserted into the repair area 20 of the component 10.

Figure 3:
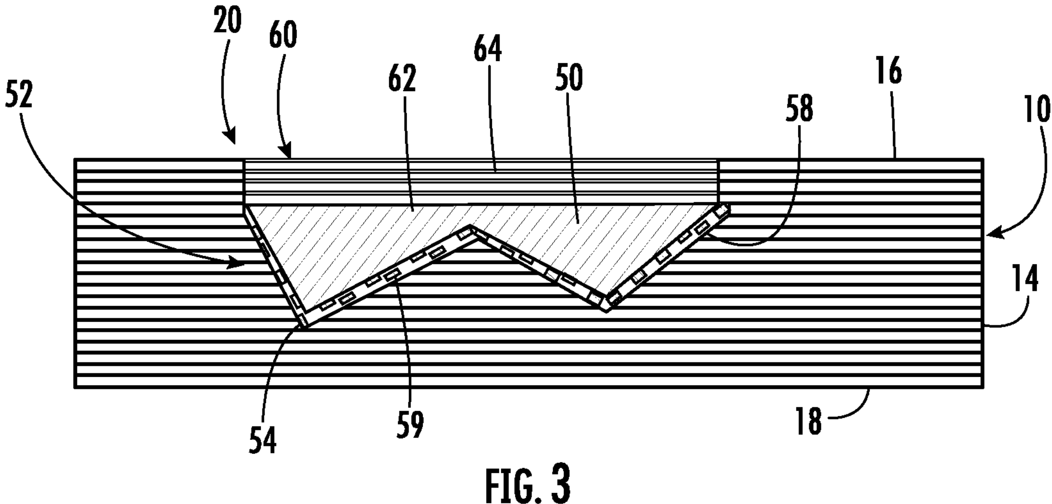
FIG. 3 is a schematic, side view of the exemplary ceramic composite component of FIGS. 1 and 2 undergoing a repair in accordance with an embodiment of the present disclosure.

FIG. 3 is a schematic diagram depicting the component 10 being repaired in accordance with an embodiment of the present disclosure. According to exemplary embodiments of the repair method according to the present disclosure, one or more repair inserts 50 are fabricated based on the repair geometry 30. For example, in exemplary embodiments, the repair inserts 50 comprise monolithic ceramics fabricated using additive manufacturing techniques. As described above, the repair inserts 50 may be additively manufactured using the repair data 44 as build data for fabricating the repair inserts 50. In the embodiment illustrated in FIG. 3, a single repair insert 50 is depicted; however, it should be understood that multiple repair inserts 50 may be used. It should also be understood that the repair inserts 50 may be fabricated using other techniques such as, but not limited to, casting, pressing, and injection molding, or a combination thereof. Additionally, the repair inserts 50 may be ground or otherwise machined to the repair geometry 30. The repair inserts 50 may comprise a solid monolithic ceramic or a monolithic cellular structure. A cellular structure includes, by way of non-limiting examples, a honeycomb structure, a foam structure, a lattice structure, a corrugated structures and other types of core structures. In FIG. 3, the repair insert 50 comprises a solid monolithic ceramic. In the illustrated embodiment, the repair insert 50 is formed or fabricated pursuant to the repair geometry 32 corresponding to a bottom portion 52 of the repair area 20. In the illustrated embodiment, the repair insert 50 is formed to encompass the entirety of the bottom portion 52 of the repair area 20 (e.g., without significant voids or empty spaces).

In the embodiment illustrated in FIG. 3, the repair insert 50 is disposed in the bottom portion 52 of the repair area 20. In exemplary embodiments, a bonding slurry 54 is applied or introduced at an interface 58 between the repair insert 50 and the surfaces(s) of the repair area 20 of the component 10 contacting the repair insert 50. The bonding slurry 54 may comprise silicon or a silicon alloy, silicon carbide powder, and carbon constituents such as carbon powders or carbon char, or carbon precursor like phenolic resin or furfuryl-alcohol resin, pore former and binder. The slurry can be in a liquid form and applied by a technique like brushing, spin coating, or spraying, for example, or in a shaped form such as in a form of tape partially dried. The tape can be formed by a technique such as tape casting and, after partial or total drying, some sections of the tape can be cut to the desired shapes before placing into the bond line. In exemplary embodiments, the slurry is cast onto a carbon matrix veil that provides better mechanical strength of the tape and facilitates the handling of the tape. The slurry casted onto a carbon matrix veil is called a matrix tape or matrix ply. Thus, in operation, the bonding slurry 54 may be applied to the interface 58, and then the repair insert 50 may be disposed in the repair area 20 in contact with the bonding slurry 54. As will be described in greater detail below, the repair inserts 50 may comprise a densified monolithic ceramic or a non-densified monolithic ceramic. Additionally, in exemplary embodiments, one or more interface plies 59 may be applied at the interface 58 and disposed in contact with the repair insert 50 to function as a crack deflection interface. The one or more interface plies 59 may comprise one or more CMC plies or the bonding slurry 54 formed as one or more matrix plies. In embodiments, the orientation of the fibers in the interface plies 59 in respect to the repair insert 50 may be tailored to provide and enhance a crack-deflecting interface between the original CMC component 10 and the repair insert 50.

In exemplary embodiments, a CMC face sheet 60 is applied above or to a top surface 62 of the repair insert 50. The CMC face sheet 60 may comprise one or more CMC plies 64 cut to a particular size or shape to cover the top surface 62 of the repair insert 50 and align the CMC face sheet 60 to be flush or nearly flush with the top surface 16 of the component 10. The CMC face sheet 60 may also extend beyond a border of the repair insert 50 and be in contact with at least a portion of the component 10. The CMC face sheet 60 may comprise the same material or a different material compared to the repair insert 50. However, even when the material of the repair insert 50 is different, it is compatible with the CMC face sheet 60 to produce a sufficient bond between the components, including in extreme operating conditions such as high temperatures. As will be described in greater detail below, the CMC face sheet 60 may comprise a densified CMC face sheet 60, a non-densified CMC face sheet 60, or a partially consolidated face sheet 60 (e.g., via an autoclave). The non-densified CMC face sheet 60 can be fully or partially pre-consolidated before being placed on top of the repair insert 50. The consolidation of the CMC face sheet 60 is typically done by applying heat, vacuum and, in some cases, pressure as in an autoclave. The CMC face sheet 60 can be partially consolidated before being introduced on top of the repair insert 50 so that the CMC face sheet 60 can still have some flexibility and to match the surface geometry of the repair insert 50. Further, the CMC face sheet 60 may be applied to the repair insert 50 before the repair insert 50 is disposed within the repair area 20 or after the repair insert 50 has been disposed within the repair area 20.

In exemplary embodiments, the repair insert 50 and the CMC face sheet 60 undergo a bonding and consolidation process together and with the component 10. For example, the repair insert 50 and the CMC face sheet 60, after being positioned in the repair area 20 of the component 10, may undergo a heat treatment, may be vacuum bagged and undergo a heat treatment, may be vacuum bagged and undergo a heat treatment and an external pressure, or may be processed in an autoclave (e.g., via a vacuum and external pressure with a heat treatment) to consolidate the CMC face sheet 60, to bond the CMC face sheet 60 to the repair insert 50, and to bond the repair insert 50 and the CMC face sheet 60 to the component 10.

In an exemplary embodiment of the present disclosure where a non-densified repair insert 50 and non-densified CMC face sheet 60 are used to repair the component 10, after the repair insert 50 and the CMC face sheet 60 have undergone the bonding and consolidation process with the component 10, the repair insert 50 and the CMC face sheet 60 undergo a densification process in the repair area 20. Examples of densification processes include melt-infiltration, polymer impregnation and pyrolysis, chemical vapor infiltration or combinations of such processes. In some embodiments the melt-infiltrant metal or alloy reacts with some reactive fillers that have been introduced in the material before the melt-infiltration step. An example of reactive fillers are carbon powders or carbon char that subsequently react with the infiltrant alloy, like a silicon-based alloy, to form silicon carbide. The repair insert 50 and the CMC face sheet 60 are thermo-chemically treated (e.g., pyrolyzed) and melt-infiltrated in the repair area 20. For example, a pyrolysis or burnout process yields char residue, and subsequent chemical processing (e.g., melt-infiltration with silicon) results in silicon infiltrating the repair insert 50 and the CMC face sheet 60 (and the bond line at the interface 58 between the repair insert 50 and the component 10 and between the CMC face sheet 60 and the component 10 and the bond line between the repair insert 50 and the CMC face sheet 60).

In another exemplary embodiment of the present disclosure, the repair insert 50 may be densified prior to inserting the repair insert 50 into the repair area 20. For example, in this embodiment, the repair insert 50 is melt-infiltrated prior to insertion of the repair insert 50 into the repair area 20. As described above, the bonding slurry 54, the interface ply 59, or both, is applied to the interface 58, followed by the densified repair insert 50 disposed within the repair area 20. The CMC face sheet 60 is applied to the top surface 62 of the repair insert 50 (e.g., before or after disposing the repair insert 50 into the repair area 20). As described above, the repair insert 50 and the CMC face sheet 60 undergo a bonding and consolidation process with the component 10. The repair insert 50 and the CMC face sheet 60, with the component 10, are thereafter thermally and chemically processed (e.g., pyrolyzed and melt-infiltrated) to densify the CMC face sheet 60.

In another exemplary embodiment of the present disclosure, the CMC plies 64 forming the CMC face sheet 60 may be laid up together and then partially pre-consolidated (e.g., via an autoclave or other technique) such that the pre-consolidated CMC plies 64 conform to the shape or geometry of the repair insert 50 (e.g., conforming to the shape or geometry of the top surface 62 of the repair insert 50). As described above, the pre-consolidated CMC plies 64 may be applied to the repair insert 50 before or after the repair insert 50 is disposed within the repair area 20.

In another exemplary embodiment of the present disclosure, a portion of the CMC face sheet 60 may be built in-situ on top of the repair insert 50 by applying one or more of the CMC plies 64 directly on top of the repair insert 50, and then one or more additional CMC plies 64 may be applied above one another on top of the previously laid up CMC plies 64.

In exemplary embodiments, the repair insert 50 may be made of silicon carbide from a grade of reaction bonded silicon carbide. As described above, densification of the repair insert 50 may occur by melt-infiltration of silicon or a silicon alloy so that the densification of the repair insert 50 can be conducted at the same time as the densification of the CMC face sheet 60 using the same method of densification. Also, densification by melt-infiltration of the reaction bonded silicon carbide occurs without significant volume change so the repair insert 50 does not shrink during the densification, thereby maintaining its original volume in the repair area 20. Further, the properties of the reaction bonded silicon carbide (RBSiC) may match very closely with the properties of the component 10 (e.g., a CMC matrix also made by melt infiltration like a SiC/SiC CMC whose silicon carbide matrix is a reaction bonded silicon carbide densified by silicon melt infiltration). Thus, embodiments of the present disclosure enable the repair of a silicon melt-infiltrated CMC component with a ceramic repair insert being a silicon melt-infiltrated silicon carbide (i.e., a reaction bonded silicon carbide). In exemplary embodiments, some carbon may be introduced in the repair insert 50, prior to its densification by melt-infiltration, by performing one or more cycles of polymer impregnation and pyrolysis of phenolic resin.

Figure 4:
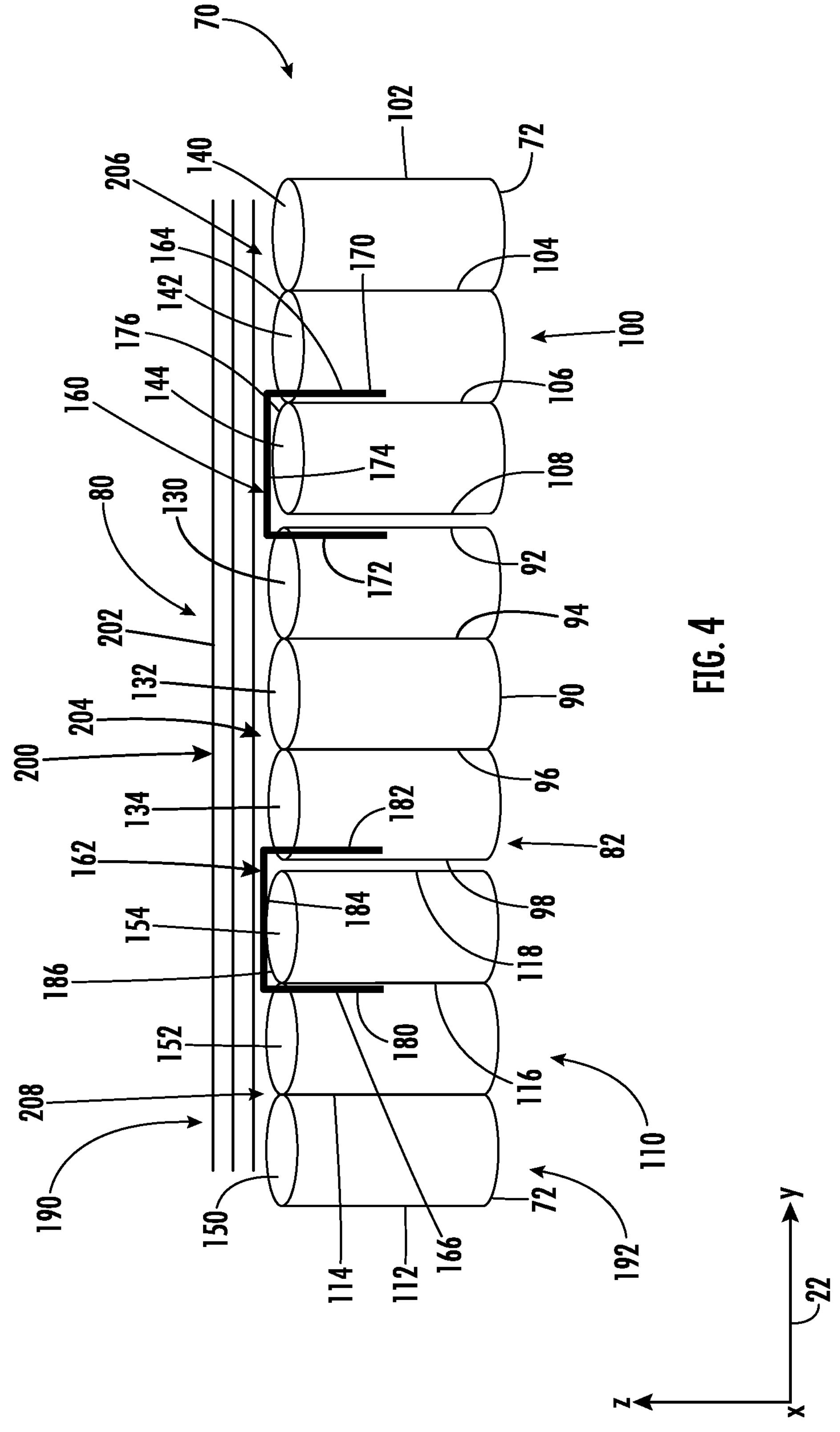
FIG. 4 is a schematic, side view of another exemplary ceramic composite component undergoing a repair in accordance with another embodiment of the present disclosure.

FIG. 4 is a diagram illustrating another exemplary embodiment of a method for repairing a component 70 according to the present disclosure. The component 70 may be similar to the component 10 (FIGS. 1-3) such that the component 70 comprises a CMC material. In FIG. 4, the component 70 comprises a CMC core 72 in the form of a cellular or honeycomb structure. In FIG. 4, the damaged area (e.g., similar to the damaged area 12 in the component 10 (FIG. 1)) has already been removed (e.g., by cutting, machining, or otherwise removing material from the component 70 encompassing the damaged area), thereby defining a repair area 80 having a defined repair geometry 82 (e.g., similar to the repair area 20 and repair geometry 30 corresponding to the component 10 (FIGS. 2 and 3)). Similar to as described and depicted in connection with FIG. 2, an imaging device 42 (FIG. 2) may be used to obtain three-dimensional data corresponding to the repair geometry 82.

In the illustrated embodiment, a repair insert 90 is fabricated based on the repair geometry 82. For example, in exemplary embodiments, the repair insert 90 comprises a monolithic ceramic (e.g., similar to the repair insert 50 (FIG. 3)) fabricated using additive manufacturing techniques. As described above, the repair insert 90 may be additively manufactured using the repair data 44 (FIG. 2) generated by the imaging device 42 (FIG. 2) as build data for fabricating the repair insert 90. In the embodiment illustrated in FIG. 4, a single repair insert 90 is depicted; however, it should be understood that multiple repair inserts 90 may be used. It should also be understood that the repair insert 90 may be fabricated using other techniques such as, but not limited to, casting, pressing, and injection molding. Additionally, the repair insert 90 may be ground or otherwise machined to the repair geometry 82.

In the illustrated embodiment, the repair insert 90 comprises a monolithic ceramic honeycomb structure defined by sidewalls 92, 94, 96, and 98. Similarly, a first portion 100 of the CMC core 72 is defined by sidewalls 102, 104, 106, and 108, and a second portion 110 of the CMC core 72 is defined by sidewalls 112, 114, 116, and 118.

In the illustrated embodiment, the repair method according to the present disclosure includes applying one or more CMC plies to form a strap to join together the CMC core 72 to the repair insert 90. For example, in the illustrated embodiment, the sidewalls 92, 94, 96, and 98 of the repair insert 90 define respective cells 130, 132, and 134 of the repair insert 90. Similarly, sidewalls 102, 104, 106, and 108 of the first portion 100 of the CMC core 72 define respective cells 140, 142, and 144 of the first portion 100 of the CMC core 72, and sidewalls 112, 114, 116, and 118 of the second portion 110 of the CMC core 72 define respective cells 150, 152, and 154 of the second portion 110 of the CMC core 72. In the illustrated embodiment, a strap 160 extends from the cell 142 to the cell 130 to join together the first portion 100 of the CMC core 72 to the repair insert 90, and a strap 162 extends from the cell 152 to the cell 134 to join together the second portion 100 of the CMC core 72 to the repair insert 90. In exemplary embodiments, the strap 160 comprises a CMC ply 164, and the strap 162 comprises a CMC ply 166. Although a single strapping CMC ply 164 and 166 is depicted forming the respective straps 160 and 162, multiple CMC plies could be used to form the respective straps 160 and 162. In the illustrated embodiment, the strap 160 includes a vertical leg 170 extending vertically (e.g., in the Z axis direction via the coordinate system 22) within the cell 142, a vertical leg 172 extending vertically (e.g., in the Z axis direction via the coordinate system 22) within the cell 130, and a horizontal leg 174 extending from the vertical leg 170 to the vertical leg 172, and extending horizontally (e.g., in the Y axis direction via the coordinate system 22) across a top side 176 of the cell 144. In the illustrated embodiment, the strap 162 includes a vertical leg 180 extending vertically (e.g., in the Z axis direction via the coordinate system 22) within the cell 152, a vertical leg 182 extending vertically (e.g., in the Z axis direction via the coordinate system 22) within the cell 134, and a horizontal leg 184 extending from the vertical leg 180 to the vertical leg 182, and extending horizontally (e.g., in the Y axis direction via the coordinate system 22) across a top side 186 of the cell 154. It should be understood that the straps 160 and 162 may extend across a greater or fewer number of cells. In the illustrated embodiment, the damaged area of the component 70 and the corresponding repair thereof are extending inwardly from a top side 190 of the component 70. Additionally or alternatively, the straps 160 and 162 may be disposed on a bottom side 192 of the component 70 (e.g., if repairing the component 70 from the bottom side 192 in addition to or alternatively to the top side 190).

In the illustrated embodiment, a CMC face sheet 200 is applied over the repair insert 90, the first portion 100 of the CMC core 72, and the second portion 110 of the CMC core 72 (e.g., on the top side 190 of the component 70). In exemplary embodiments, the CMC face sheet 200 comprises one or more CMC plies 202 extending across a top side 204 of the repair insert 90, a top side 206 of the first portion 100 of the CMC core 72, and a top side 208 of the second portion 110 of the CMC core 72 (e.g., on the top side 190 of the component 70). Similar to as described above in connection with the repair of the component 10 (FIGS. 1-3), the repair insert 90 may comprise a densified monolithic ceramic (i.e., no further appreciable increase in density of the repair insert 90 during subsequent processing) or a non-densified monolithic ceramic (i.e., the density of the repair insert 90 increases during subsequent processing, such as by pore filling during melt-infiltration).

In exemplary embodiments, the repair insert 90, the straps 160 and 162, and the CMC face sheet 200 undergo a bonding and consolidation process with the component 70. For example, the repair insert 90, the straps 160 and 162, and the CMC face sheet 200, after being positioned in the repair area 80 of the component 70, may undergo a heat treatment, may be vacuum bagged and undergo a heat treatment, or may be processed in an autoclave (e.g., via a vacuum and external pressure with a heat treatment) to bond and consolidate the repair insert 90, the straps 160 and 162, and the CMC face sheet 200 to the component 70. Similar to as described above in connection with the repair of the component 10 (FIGS. 1-3), a bonding slurry 54 (FIG. 3) may be applied at interfaces between the repair insert 90 and the first portion 100 of the CMC core 72, and between the repair insert 90 and the second portion 110 of the CMC core 72.

In an exemplary embodiment of the present disclosure where a non-densified repair insert 90 and a non-densified CMC face sheet 200 are used to repair the component 70, after the repair insert 90, the straps 160 and 162, and the CMC face sheet 200 have undergone the bonding and consolidation process with the component 70, the repair insert 90, the straps 160 and 162, and the CMC face sheet 200, together with the component 70, undergo a densification process such that the repair insert 90, the straps 160 and 162, and the CMC face sheet 200, together with the component 70, are thermally treated (e.g., pyrolyzed) and melt-infiltrated. For example, the pyrolysis or burnout process yields char residue, and subsequent chemical processing (e.g., melt-infiltration with silicon) results in silicon infiltrating the repair insert 90, the straps 160 and 162, and the CMC face sheet 200.

In another exemplary embodiment of the present disclosure, the repair insert 90 may be densified prior to inserting the repair insert 90 into the repair area 80. For example, in this embodiment, the repair insert 90 is thermally treated (e.g., pyrolyzed) and melt-infiltrated prior to insertion of the repair insert 90 into the repair area 80. As described above, the bonding slurry 54 (FIG. 3) may be applied to interfaces between the repair insert 90 and the first portion 100 of the CMC core 72 and the second portion 110 of the CMC core 72, followed by the densified repair insert 90 disposed within the repair area 80. The CMC face sheet 200 is applied to the top side 204 of the repair insert 90. As described above, the repair insert 90, the straps 160 and 162, and the CMC face sheet 200 undergo a bonding and consolidation process with the component 70. The repair insert 90, the straps 160 and 162, and the CMC face sheet 200, with the component 70, are thereafter thermally and chemically processed (e.g., pyrolyzed and melt-infiltrated) to densify the straps 160 and 162 and the CMC face sheet 200 and densify the bond lines between the straps 160 and 162 repair insert 90, between the CMC core 72 and the straps 160 and 162, and between the straps 160 and 162 and the CMC face sheet 200.

In another exemplary embodiment of the present disclosure, the CMC plies 202 forming the CMC face sheet 200 may be laid up together and then partially pre-consolidated (e.g., via an autoclave or other technique) such that the pre-consolidated CMC plies 202 conform to the shape or geometry of the repair insert 90 (e.g., conforming to the shape or geometry of the top side 204 of the repair insert 90)

and the top sides 206 and 208 of the respective first and second portions 100 and 110 of the CMC core 72.

Figure 5:
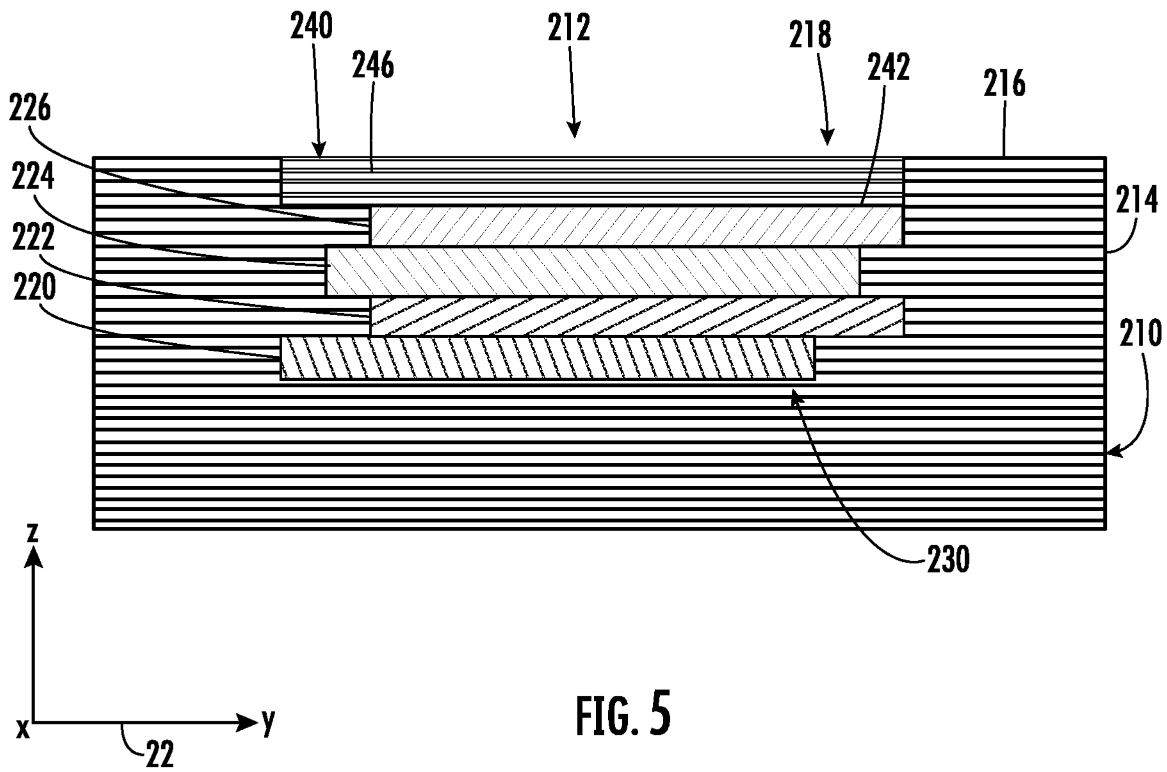
FIG. 5 is a schematic, side view of another exemplary ceramic composite component undergoing a repair in accordance with another embodiment of the present disclosure.

FIG. 5 is a schematic diagram illustrating another exemplary embodiment of a method for repairing a component 210 according to the present disclosure. The component 210 may be similar to the component 10 (FIGS. 1-3) or component 70 (FIG. 4) such that the component 210 comprises a CMC material. In FIG. 5, the damaged area of the component 210 (e.g., similar to the damaged area 12 of the component 10 (FIG. 1)) has been removed to define a repair area 212 in the component 210. For example, in exemplary embodiments, the component 210 may be cut, ground, machined, or otherwise processed to remove material from the component 210 encompassing the damaged area to define the repair area 212 and correspondingly define a repair geometry 218. In the illustrated embodiment, one or more CMC plies 214 have been cut or machined away from the component 210 extending in a direction inwardly from a top surface 216 of the component 210 (e.g., in the direction of the Z axis as indicated via a coordinate system 22) to remove the damaged area (and although not readily visible in FIG. 5, also extending laterally in the direction of the X and Y axes as indicated via the coordinate system 22). The amount of material removed from the component 210 to remove the damaged area and define the repair area 212 and repair geometry 218 may vary depending on the extent of the damaged area. For example, in exemplary embodiments, the amount of material removed from the component 210 to encompass and remove the damaged area and define the repair area 212 and repair geometry 218 may be sufficient to expose non-damaged portions of the component 210 or expose a certain surface area for receiving repair materials (s). Alternately or additionally, the repair area 212 and repair geometry 218 may correspond to a predefined three-dimensional space or volume corresponding to a predefined repair material or component. For example, in exemplary embodiments, a repair material or component may comprise a pre-fabricated material or component having a pre-defined shape or volume usable in a variety of different repairs such that the repair area 212 and repair geometry 218 is sized or configured to match the pre-defined repair material or component.

In the illustrated embodiment, repair inserts 220, 222, 224, and 226 are fabricated based on the repair geometry 218. For example, in exemplary embodiments, the repair inserts 220, 222, 224, and 226 comprise monolithic ceramics fabricated using additive manufacturing techniques. As described above, the repair inserts 220, 222, 224, and 226 may be additively manufactured using the repair data 44 (FIG. 2) as build data for fabricating the repair inserts 220, 222, 224, and 226. It should also be understood that the repair inserts 220, 222, 224, and 226 may be fabricated using other techniques such as, but not limited to, casting, pressing, and injection molding. Additionally, the repair inserts 220, 222, 224, and 226 may be ground or otherwise machined to the repair geometry 218. The repair inserts 220, 222, 224, and 226 may comprise a solid monolithic ceramic or a monolithic ceramic honeycomb structure. In FIG. 5, the repair inserts 220, 222, 224, and 226 comprise a solid monolithic ceramic. In exemplary embodiments, one or more of the repair inserts 220, 222, 224, and 226 are made of silicon carbide. In exemplary embodiments, one or more of the repair inserts 220, 222, 224, and 226 are made of silicon carbide from a grade of reaction bonded silicon carbide.

In the embodiment illustrated in FIG. 5, the repair inserts 220, 222, 224, and 226 are disposed in the repair area 212 in a stacked arrangement. For example, the repair insert 220 is disposed in a bottom portion 230 of the repair area 212, with the repair insert 222 disposed above the repair insert 220, the repair insert 224 disposed above the repair insert 222, and the repair insert 226 disposed above the repair insert 224. In exemplary embodiments, the bonding slurry 54 (FIG. 3), the interface ply 59 (FIG. 3), or both, is applied or introduced at interfaces between the repair inserts 220, 222, 224, and 226 and the surfaces(s) of the repair area 212 of the component 210 contacting the repair inserts 220, 222, 224, and 226, or at the interfaces between the repair inserts 220, 222, 224, and 226, or both. Similar to as described above, the repair inserts 220, 222, 224, and 226 may comprise a densified monolithic ceramic or a non-densified monolithic ceramic. Although not depicted in FIG. 5, one or more interface plies 59 may be applied at the interfaces between the repair inserts 220, 222, 224, and 226 and the component 210 and disposed in contact with the repair inserts 220, 222, 224, and 226 to function as a crack defection interface (e.g., similar to the interface plies 59 (FIG. 3)).

In exemplary embodiments, a CMC face sheet 240 is applied to a top surface 242 of the repair insert 226 (e.g., the top surface of the uppermost repair insert). The CMC face sheet 240 may comprise one or more CMC plies 246 cut to a particular size or shape to cover the top surface 242 of the repair insert 226 and align the CMC face sheet 240 to be flush or nearly flush with the top surface 216 of the component 210. The CMC face sheet 240 may comprise the same material or a different material compared to the repair inserts 220, 222, 224, and 226. However, even when the material of the repair inserts 220, 222, 224, and 226 is different, it is compatible with the CMC face sheet 240 to produce a sufficient bond between the components, including in extreme operating conditions such as high temperatures. Similar to as described above in connection with the CMC face sheet 60 (FIG. 3) or the CMC face sheet 200 (FIG. 4), the CMC face sheet 240 may comprise a densified CMC face sheet 240 or a non-densified CMC face sheet 240. Further, the CMC face sheet 240 may be applied to the repair insert 226 before the repair insert 226 is disposed within the repair area 212 or after the repair insert 226 has been disposed within the repair area 212.

As illustrated in FIG. 5, multiple repair inserts 220, 222, 224, and 226 may be used in the repair area 212 and the multiple repair inserts 220, 222, 224, and 226 bonded together. For example, in exemplary embodiments, the repair inserts 220, 222, 224, and 226 may be bonded together prior to or after insertion into the repair area 212. Similar to the repair methods described above in connection with the method for repairing the component 10 (FIGS. 1-3) or component 70 (FIG. 4), the repair inserts 220, 222, 224, and 226 and the CMC face sheet 240 undergo a bonding and consolidation process with the component 210. For example, the repair inserts 220, 222, 224, and 226 and the CMC face sheet 240, after being positioned in the repair area 212 of the component 210, may undergo a heat treatment, may be vacuum bagged and undergo a heat treatment, or may be processed in an autoclave (e.g., via a vacuum and external pressure with a heat treatment) to bond and consolidate the repair inserts 220, 222, 224, and 226 and the CMC face sheet 240 to the component 210. The repair inserts 220, 222, 224, and 226 may also undergo a bonding and consolidation process together before being inserted into the repair area 212. Similar to as described above in connection with the repair of the component 10 (FIGS. 1-3), the bonding slurry 54 (FIG. 3), the interface ply 59, or both, may be applied at interfaces between the repair inserts 220, 222, 224, and 226 and the component 210, between the CMC face sheet 240 and the component 210, or both.

In an exemplary embodiment of the present disclosure where non-densified repair inserts 220, 222, 224, and 226 and a non-densified CMC face sheet 240 are used to repair the component 210, after the repair inserts 220, 222, 224, and 226 and the CMC face sheet 240 have undergone the bonding and consolidation process with the component 210, the repair inserts 220, 222, 224, and 226 and the CMC face sheet 240, together with the component 210, undergo a densification process such that the repair inserts 220, 222, 224, and 226 and the CMC face sheet 240, together with the component 210, are thermally treated (e.g., pyrolyzed) and melt-infiltrated. For example, the pyrolysis process yields char residue, and subsequent processing (e.g., melt-infiltration with silicon) results in silicon infiltrating the repair inserts 220, 222, 224, and 226 and the CMC face sheet 240. The pyrolysis process is typically done at temperatures between 300° C. and 1200° C., preferentially between 500° C. and 1100° C. The melt infiltration with silicon or silicon alloy is typically done at temperatures between 1300° C. and 1600° C., preferentially between 1350° C. and 1450° C.

In another exemplary embodiment of the present disclosure, the repair inserts 220, 222, 224, and 226 may be densified prior to inserting the repair inserts 220, 222, 224, and 226 into the repair area 212. For example, in this embodiment, the repair inserts 220, 222, 224, and 226 are thermally treated (e.g., pyrolyzed) and melt-infiltrated prior to insertion of the repair inserts 220, 222, 224, and 226 into the repair area 212. As described above, the bonding slurry 54 (FIG. 3), the interface ply 59, or both, may be applied to interfaces between the repair inserts 220, 222, 224, and 226 and the component 210, followed by the densified repair inserts 220, 222, 224, and 226 being disposed within the repair area 212. The CMC face sheet 240 is applied to the top surface 242 of the repair insert 226. The bonding slurry 54 (FIG. 3), the interface ply 59, or both, may also be applied between the CMC face sheet 240 and the repair insert 226, between the CMC face sheet 240 and the component 210, or both. As described above, the repair inserts 220, 222, 224, and 226 and the CMC face sheet 240 undergo a bonding and consolidation process with the component 210 and between themselves (i.e., the repair inserts 220, 222, 224, and 226). The repair inserts 220, 222, 224, and 226 and the CMC face sheet 240, with the component 210, are thereafter thermally and chemically processed (e.g., pyrolyzed and melt-infiltrated) to densify the CMC face sheet 240 and densify the bond lines between the component 210 and the repair inserts 220, 222, 224, and 226, between the component 210 and the CMC face sheet 240, and between the repair insert 226 and the CMC face sheet 240.

In another exemplary embodiment of the present disclosure, the CMC plies 246 forming the CMC face sheet 240 may be laid up together by positioning the individual CMC plies 246 above one another and then partially pre-consolidated (e.g., via an autoclave or other technique) such that the pre-consolidated CMC plies 246 conform to the shape or geometry of the repair insert 226 (e.g., conforming to the shape or geometry of the top surface 242 of the repair insert 226) and the top surface 216 of the component 210.

In the embodiments illustrated in FIGS. 1-5, the repair of the respective components 10 (FIGS. 1-3), 70 (FIG. 4), and 210 (FIG. 5) is being performed from a single side or surface of the respective components 10 (FIGS. 1-3), 70 (FIG. 4), and 210 (FIG. 5). However, it should be understood that the repair of the respective components 10 (FIGS. 1-3), 70 (FIG. 4), and 210 (FIG. 5) may be performed concurrently from multiple sides or surfaces of the component 10 (FIGS. 1-3), the component 70 (FIG. 4), and the component 210 (FIG. 5).

Figure 6:
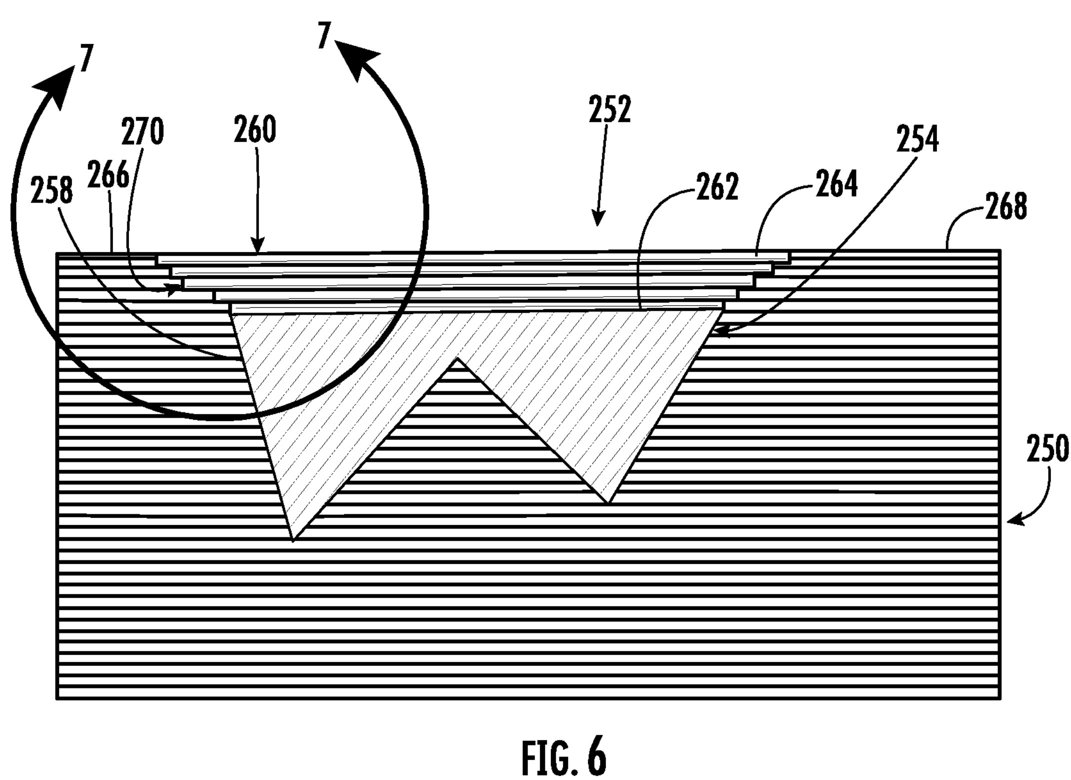
FIG. 6 is a schematic, side view of another exemplary ceramic composite component undergoing a repair in accordance with another embodiment of the present disclosure.

FIG. 6 is a schematic diagram illustrating another exemplary embodiment of a method for repairing a component 250 according to the present disclosure. The component 250 may be similar to the component 10 (FIGS. 1-3), component 70 (FIG. 4), or the component 210 (FIG. 5) such that the component 250 comprises a CMC material. In FIG. 6, the damaged area of the component 250 (e.g., similar to the damaged area 12 of the component 10 (FIG. 1)) has been removed to define a repair area 252 in the component 250. For example, in exemplary embodiments, the component 250 may be cut, ground, machined, or otherwise processed to remove material from the component 250 encompassing the damaged area to define the repair area 252 and correspondingly define a repair geometry 254.

Similar to as described above, in the illustrated embodiment, one or more repair inserts 258 are fabricated based on the repair geometry 254. The one or more repair inserts 258 may be fabricated similar to the repair insert 50 (FIG. 3), the repair insert 90 (FIG. 4), or the repair inserts 220, 222, 224, and 226 (FIG. 5). A CMC face sheet 260 is applied to a top surface 262 of the repair insert 258. The CMC face sheet 260 may comprise one or more CMC plies 264 cut to a particular size or shape to cover the top surface 262 of the repair insert 258 and align the CMC face sheet 260 to be flush or nearly flush with the a top surface 266 of the component 250.

In the illustrated embodiment, at least a portion of the repair area 252 or repair geometry 254 includes a stepped geometry or shape such that at least one or more of the CMC plies 264 forming the CMC face sheet 260 overlap a portion of the component 250. For example, in the illustrated embodiment, the component 250 may comprise one or more CMC plies 268. Portions of one or more of the CMC plies 268 may be cut, machined, or removed to form a stepped geometry 270 for the repair geometry 254. Thus, the CMC face sheet 260 may be configured with a complementary stepped configuration such that one or more of the CMC plies 264 overlap one or more of the CMC plies 268, such as in a lap joint or overlap joint used in woodworking techniques. However, it should be understood that the repair geometry 254 may alternatively or additionally include tapered portions.

Figure 7:
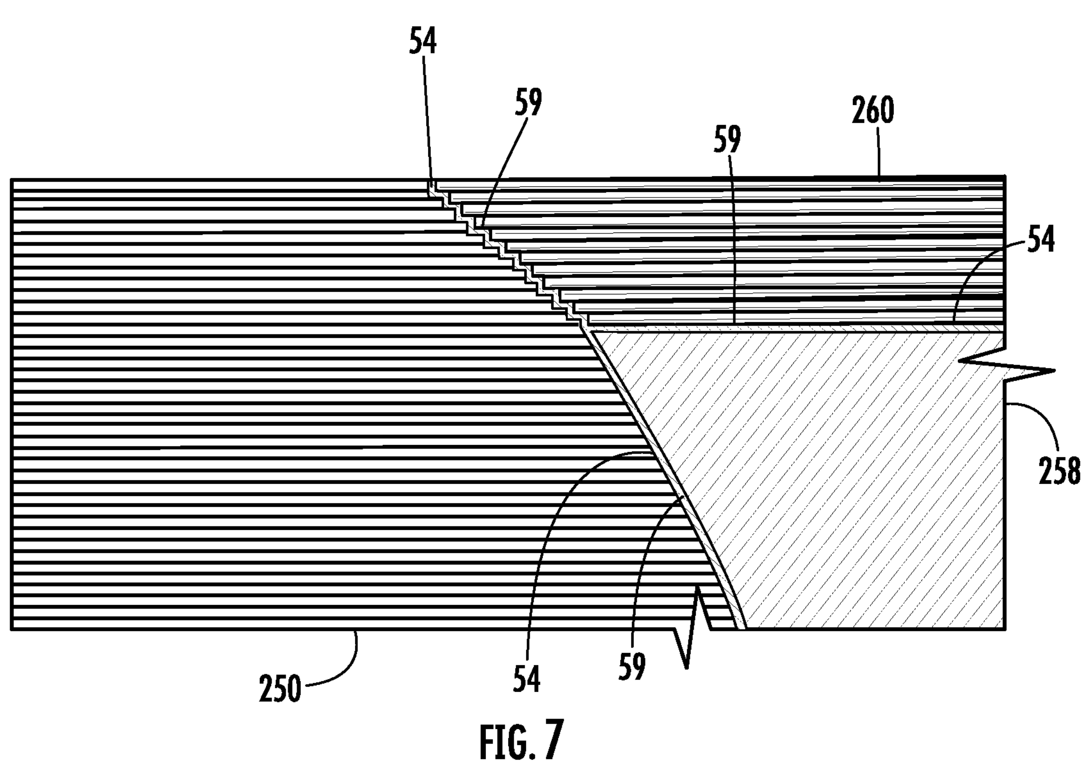
FIG. 7 is a schematic, enlarged view of a portion of the ceramic composite component undergoing a repair of FIG. 6 in accordance with an embodiment of the present disclosure.

FIG. 7 is an enlarged schematic view of a portion of the repaired component 250 of FIG. 6 in accordance with exemplary embodiments of the present disclosure. In the illustrated embodiment, the bonding slurry 54 may be disposed at interfaces between the component 25 and the CMC face sheet 260, between the component 250 and the repair insert 258, and between the CMC face sheet 260 and the repair insert 258. Further, in exemplary embodiments, one or more of the interface plies 59 may be disposed at interfaces between the component 25 and the CMC face sheet 260, between the component 250 and the repair insert 258, and between the CMC face sheet 260 and the repair insert 258. Similar to as described above, the repair insert 258 and the CMC face sheet 260 are bonded together and to the component 250 and thermally and chemically processed (before or after being applied or inserted into the component 250).

Figure 8A:
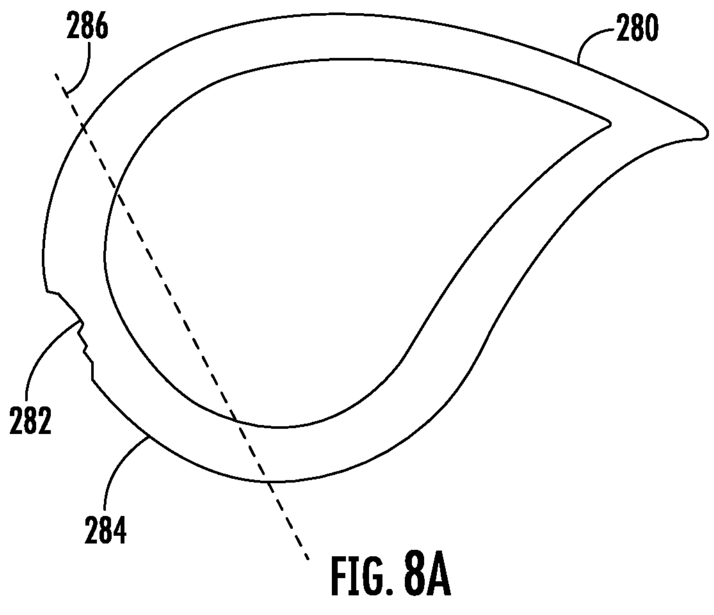
FIG. 8A is a schematic diagram illustrating a stage of a repair to another exemplary ceramic composite component in accordance with another embodiment of the present disclosure.
Figure 8B:
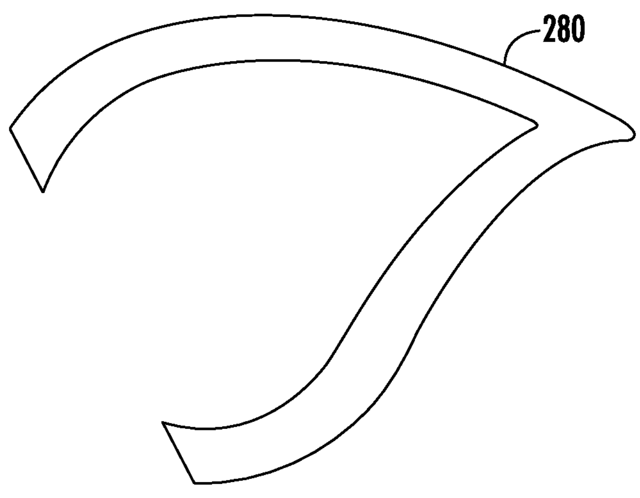
FIG. 8B is a schematic diagram illustrating another stage of a repair to the exemplary ceramic composite component of FIG. 8A in accordance with another embodiment of the present disclosure.

FIG. 8A is a schematic diagram depicting a cross-section of an airfoil 280 to be repaired in accordance with embodiments of the present disclosure, and FIG. 8B is a schematic diagram depicting the cross-section of the airfoil 280 of FIG. 8A with a damaged portion removed in accordance with embodiments of the present disclosure. As described above, the airfoil 280 may comprise a CMC material, similar to the component 10 (FIGS. 1-3), the component 70 (FIG. 4), the component 210 (FIG. 5), or the component 250 (FIGS. 6 and 7). In FIG. 8A, the airfoil 280 may comprise a damaged area 282, and in preparation for a repair, a portion 284 of the airfoil 280 may be removed, such as by cutting, grinding, or machining along the line 286. FIG. 8B depicts the airfoil 280 with the portion 284 (FIG. 8A) removed.

Figure 9:
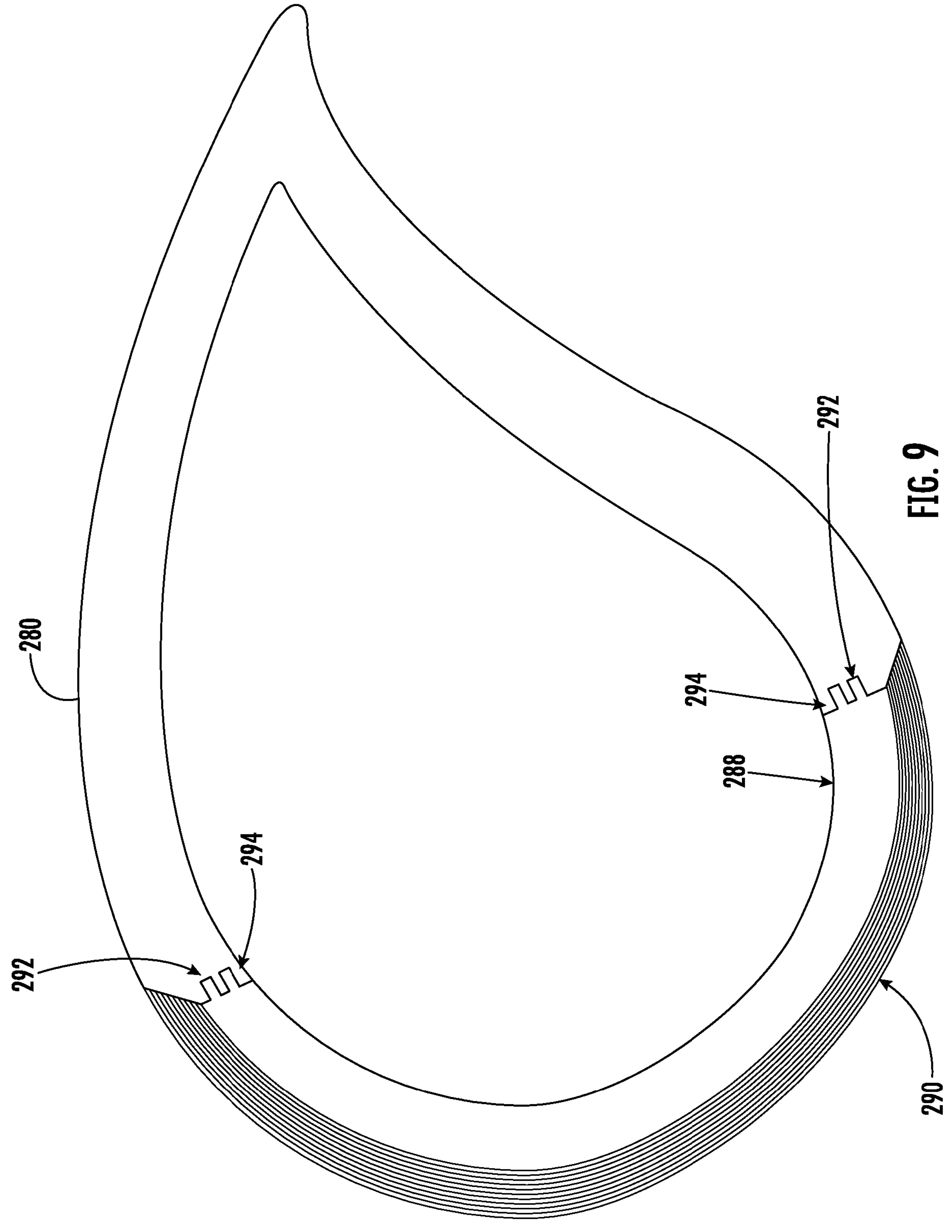
FIG. 9 is a schematic view depicting another stage of the repair to the ceramic composite component of FIGS. 8A and 8B in accordance with an embodiment of the present disclosure.

FIG. 9 is a schematic diagram depicting a repair to the airfoil 280 according to exemplary embodiments of the present disclosure. Similar to as described above, the repair includes one or more repair inserts 288 and a CMC face sheet 290. The one or more repair inserts 288 may be formed similar to the repair insert 50 (FIG. 3), the repair insert 90 (FIG. 4), the repair inserts 220, 222, 224, and 226 (FIG. 5), or the repair insert 258 (FIG. 6). Additionally, the CMC face sheet 290 may be formed similar to the CMC face sheet 60 (FIG. 3), the CMC face sheet 200 (FIG. 4), the CMC face sheet 240 (FIG. 5), or the CMC face sheet 290 (FIG. 6). In exemplary embodiments, the repair insert 288 enables a desired geometry or curvature be obtained for the lay-up of CMC plies on top of the repair insert 288 so as to match the original shape of the airfoil 280. Performing the repair without the repair insert 288 would require complex tooling to maintain the shape of the CMC face sheet 290 during the consolidation of the CMC plies forming the CMC face sheet 290 by autoclave, for example.

In the illustrated embodiment, the repair insert 288 includes an interlocking feature 292 configured to mechanically engage a geometrically complementary interlocking feature 294 formed on the airfoil 280. The interlocking features 292 and 294 may comprise any type of woodworking-like joint such as, by way of non-limiting example, tongue and groove, mortise and tenon, or lap. It should also be understood that the interface between the airfoil 280 and the repair insert 288 or the interface between the airfoil 280 and the CMC face sheet 290 may also comprise a butt joint or a tapered joint arrangement. In exemplary embodiments, similar to as described above, the repair insert 288 and the CMC face sheet 290 are bonded together and to the airfoil 280 and thermally and chemically processed (before or after being applied or inserted into the airfoil 280).

Figure 10:
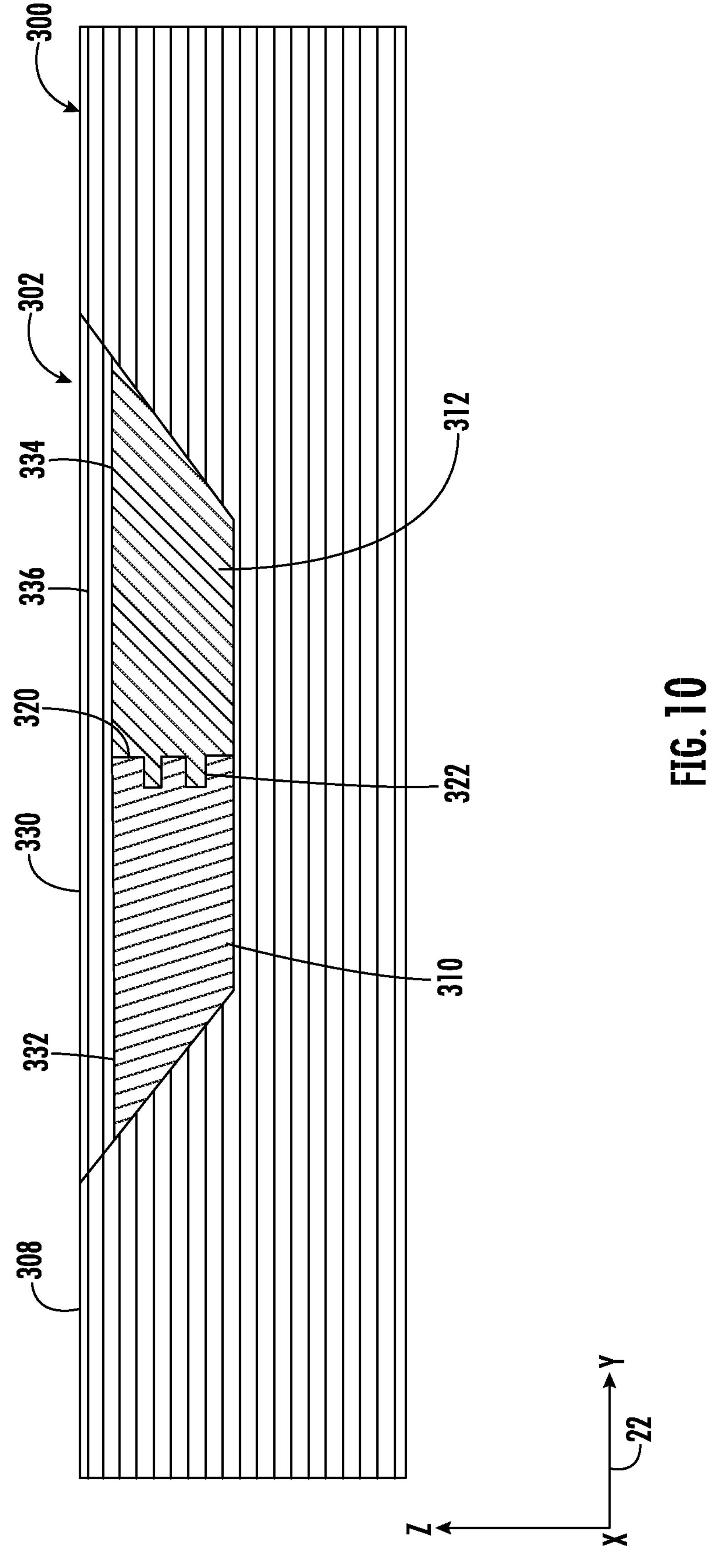
FIG. 10 is a schematic, side view of another exemplary ceramic composite component undergoing a repair in accordance with another embodiment of the present disclosure.

FIG. 10 is a schematic diagram illustrating another exemplary embodiment of a method for repairing a component 300 according to the present disclosure. The component 300 may be similar to the component 10 (FIGS. 1-3), the component 70 (FIG. 4), the component 210 (FIG. 5), the component 250 (FIGS. 6 and 7), or the airfoil 280 (FIGS. 8A-9) such that the component 300 comprises a CMC material. In FIG. 10, the damaged area of the component 300 (e.g., similar to the damaged area 12 of the component 10 (FIG. 1)) has been removed to define a repair area 302 in the component 300. For example, in exemplary embodiments, the component 300 may be cut, ground, machined, or otherwise processed to remove material from the component 210 encompassing the damaged area to define the repair area 302 and correspondingly define a repair geometry 304. In the illustrated embodiment, one or more CMC plies 306 have been cut or machined away from the component 300 extending in a direction inwardly from a top surface 308 of the component 300 (e.g., in the direction of the Z axis as indicated via the coordinate system 22) to remove the damaged area (and although not readily visible in FIG. 10, also extending laterally in the direction of the X and Y axes as indicated via the coordinate system 22). The lateral and depth (or amount) of material removed from the component 300 to remove the damaged area and define the repair area 302 and repair geometry 304 may vary depending on the extent of the damaged area.

In the illustrated embodiment, repair inserts 310 and 312 are fabricated based on the repair geometry 304. For example, in exemplary embodiments, the repair inserts 310 and 312 comprise monolithic ceramics fabricated using additive manufacturing techniques. As described above, the repair inserts 310 and 312 may be additively manufactured using the repair data 44 (FIG. 2) as build data for fabricating the repair inserts 310 and 312. Additionally, the repair inserts 310 and 312 may be ground or otherwise machined to the repair geometry 304. The repair inserts 310 and 312 may comprise a solid monolithic ceramic or a monolithic ceramic honeycomb structure. In FIG. 10, the repair inserts 310 and 312 comprise a solid monolithic ceramic. In exemplary embodiments, one or more of the repair inserts 310 and 312 are made of silicon carbide. In exemplary embodiments, one or more of the repair inserts 310 and 312 are made of silicon carbide from the grade of reaction bonded silicon carbide. Thus, it should be understood that the repair inserts 310 and 312 may be formed similar to the repair insert 50 (FIG. 3), the repair inserts 220, 222, 224, and 226 (FIG. 5), the repair insert 258 (FIG. 6), or the repair insert 288 (FIG. 9).

In the embodiment illustrated in FIG. 10, the repair inserts 310 and 312 are positioned in the repair area 302. In exemplary embodiments, the repair inserts 310 and 312 are formed with complementary interlocking features 320 and 322, respectively, that engage each other to mechanically secure or interlock the repair inserts 310 and 312 to each other. In exemplary embodiments, the interlocking features 320 and 322 may be any mechanical interlocking techniques commonly used in the woodworking joining field such as, by way of non-limiting examples, dovetail joints, dowelled joints, tenon joints, dowel tenon joints, bridle joints, and scarf joints. Although two repair inserts 310 and 312 are depicted in FIG. 10, it should be understood that additional repair inserts may be used (e.g., laying above one another in the direction of the Z axis as indicated via the coordinate system 22 or laterally in the directions of the X axis and Y axis as indicated via the coordinate system 22).

In the illustrated embodiment, a CMC face sheet 330 is applied to a top surface 332 of the repair insert 310 and a top surface 334 of the repair insert 312. The CMC face sheet 330 may comprise one or more CMC plies 336 cut to a particular size or shape to cover the top surfaces 332 and 334 of the respective repair inserts 310 and 312 and align the CMC face sheet 330 to be flush or nearly flush with the top surface 308 of the component 300. The CMC face sheet 330 and repair inserts 310 and 312 may be bonded to each other and to the component 300 similar to as set forth above in connection with the repair of the component 10 (FIGS. 1-3), the component 70 (FIG. 4), the component 210 (FIG. 5), the component 250 (FIG. 6), or the airfoil 280 (FIGS. 8A-9).

Thus, as described above, in one exemplary embodiment, a green ceramic repair insert (e.g., a repair insert that has not been densified by silicon melt-infiltration) is placed in the repair area, a separate CMC face sheet is formed, and consolidation of the CMC face sheet and bonding of the CMC face sheet to the ceramic repair insert occur at the same time. For example, in such an exemplary embodiment, a geometry of the repair insert is determined by a 3D scan of the repair area such that a CAD file is obtained and used to additively manufacture a monolithic ceramic repair insert. Optionally, some carbon chars may be introduced in the printed ceramic repair insert by performing some cycles of polymer impregnation and pyrolysis of phenolic resin.

Optionally, a bonding slurry is introduced on the surface or interface of the CMC component that is going to receive the ceramic repair insert and the CMC face sheet and at the surface or interface of the ceramic repair insert that is going to receive the CMC face sheet. This slurry contains some silicon carbide powder and carbon constituent-like carbon powders or carbon precursor resin (like phenolic resin or furfuryl alcohol resin). The ceramic repair insert is placed in the repair area of the CMC component. One or more CMC fiber plies are cut to shape to cover a top surface of the ceramic repair insert, and the individual CMC plies are inserted above one another to form a CMC face sheet. The CMC face sheet is then placed on top of the ceramic repair insert. The combined components (i.e., the CMC component being repaired, the ceramic repair insert, and the CMC face sheet) undergo a consolidation step to consolidate the components together. The consolidation step can be done by application of heat/vacuum/pressure inside an autoclave or outside of autoclave, heat/vacuum through the use of a vacuum apparatus like a vacuum bag and a furnace, or heat only. The combined components undergo a pyrolysis/burnout step to burn the organic from the slurry and to pyrolyze the resin into carbon char. The combined components then undergo a silicon melt-infiltration process in which some silicon or silicon alloy is brought to infiltrate and densify the repair insert, the bond lines, and the fiber plies of the CMC face sheet.

In another exemplary embodiment, a green ceramic repair insert is placed in a repair area, a separate CMC face sheet is formed, and pre-consolidation of the CMC face sheet is performed before bonding the CMC face sheet to the ceramic repair insert. As described above, optionally, a bonding slurry is introduced on the surface or interface of the CMC component that is going to receive the ceramic repair insert and the CMC face sheet and at the surface or interface of the ceramic repair insert that is going to receive the CMC face sheet. In such an embodiment, the ceramic repair insert is placed in the repair area of the CMC component. One or more CMC plies are cut to shape to cover the top surface of the ceramic repair insert. The CMC plies are laid up one by one on top of each other to form a CMC face sheet. The CMC face sheet is partially pre-consolidated by autoclave such that the CMC face sheet will conform to the shape of the ceramic repair insert. The CMC face sheet is then placed on top of the ceramic repair insert. The combined components (i.e., the CMC component being repaired, the ceramic repair insert, and the CMC face sheet) undergo a consolidation step to consolidate the components together. The consolidation step can be done by application of heat/vacuum/pressure inside an autoclave or outside of autoclave, heat/vacuum through the use of a vacuum apparatus like a vacuum bag and a furnace, or heat only. The combined components undergo a pyrolysis/burnout step to burn the organic from the slurry and pyrolysis the resin into carbon char. The combined components then undergo a silicon melt infiltration process in which some silicon is brought to infiltrate and densify the ceramic repair insert, the bond lines, and the CMC plies. In such an embodiment, the consolidation of the CMC face sheet usually requires more pressure than bonding the CMC face sheet to the ceramic repair insert. Since the CMC face sheet is pre-consolidated in a separate step prior to being bonded to the ceramic repair insert, the bonding step does not require as much pressure and, in the case of ceramic repair insert having cellular structure with thin wall (and thus brittle in the green state, before a melt-infiltration step), the ceramic repair insert does not have to be consolidated by a separate melt-infiltration step prior to being inserted in the repair area. Thus, only a single melt-infiltration step can be used to densify both the ceramic repair insert, the CMC face sheet, and the bond lines between the different constituents (bond lines between ceramic repair insert and the CMC face sheet, between the ceramic repair insert and the CMC component being repaired, and between the CMC face sheet and the CMC component being repaired).

In another exemplary embodiment, a green ceramic repair insert is placed in a repair area of the CMC component, CMC plies are laid up one by one directly on top of the ceramic repair insert. In such an embodiment, optionally, a bonding slurry is introduced on the surface of the CMC component that is going to receive the ceramic repair insert and the CMC face sheet and at the surface of the ceramic repair insert that is going to receive the CMC face sheet. The ceramic repair insert is placed in the repair area of the CMC component. One or more CMC plies are cut to shape to cover the top surface of the ceramic repair insert. The CMC plies are laid up one by one on top of each other directly on top of the ceramic repair insert with the ceramic repair insert in the repair area to form the CMC face sheet. The combined components (i.e., the CMC component being repaired, the ceramic repair insert, and the CMC face sheet) undergo a consolidation step to consolidate the components together. The consolidation step can be done by application of heat/vacuum/pressure inside an autoclave or outside of autoclave, heat/vacuum through the use of a vacuum apparatus like a vacuum bag and a furnace, or heat only. The combined components undergo a pyrolysis/burnout step to burn the organic from the slurry and pyrolysis the resin into carbon char. The combined components then undergo a silicon melt-infiltration process in which some silicon is brought to infiltrate and densify the ceramic repair insert, the bond lines, and the CMC plies.

In another exemplary embodiment, the ceramic repair insert is melt-infiltrated prior to being inserted in the repair area, a separate CMC face sheet is formed, and consolidation of the CMC face sheet and bonding to the ceramic repair insert occur at the same time. In such an embodiment, the ceramic repair insert is melt-infiltrated. Optionally, a bonding slurry is introduced on the surface of the CMC component that is going to receive the ceramic repair insert and the CMC face sheet and at the surface of the ceramic repair insert that is going to receive the CMC face sheet. The ceramic repair insert is placed in the repair area of the CMC component. One or more CMC plies are cut to shape to cover the top surface of the ceramic repair insert. The CMC plies are laid up one by one on top of each other to form the CMC face sheet, and then the CMC face sheet is placed on top of the ceramic repair insert. The combined components (i.e., the CMC component being repaired, the ceramic repair insert, and the CMC face sheet) undergo a consolidation step to consolidate the components together. The consolidation step can be done by application of heat/vacuum/pressure inside an autoclave or outside of autoclave, heat/vacuum through the use of a vacuum apparatus like a vacuum bag and a furnace, or heat only. The combined components undergo a pyrolysis/burnout step to burn the organic from the slurry and CMC face sheet and pyrolysis the resin into carbon char. The combined components then undergo a silicon melt-infiltration process in which some silicon is brought to infiltrate and densify the bond lines and the CMC face sheet. Alternatively, in embodiments, the silicon melt-infiltrated ceramic repair insert contains enough free silicon to infiltrate the CMC face sheet so that no additional silicon is needed to infiltrate the CMC face sheet.

In another exemplary embodiment, a ceramic repair insert is melt-infiltrated prior to being inserted in a repair area of the CMC component, a separate CMC face sheet is formed, and pre-consolidation of the CMC face sheet is performed before bonding the CMC face sheet to the ceramic repair insert. In such an embodiment, the ceramic repair insert is melt-infiltrated. Optionally, a bonding slurry is introduced on the surface of the CMC component that is going to receive the ceramic repair insert and the CMC face sheet and at the surface of the ceramic repair insert that is going to receive the CMC face sheet. The ceramic repair insert is placed in the repair area of the CMC component. One or more CMC plies are cut to shape to cover the top surface of the ceramic repair insert. The CMC plies are laid up by one on top of each other to form a CMC face sheet. The CMC face sheet is then partially pre-consolidated by autoclave such that the CMC face sheet will conform to the shape of the ceramic repair insert. The CMC face sheet is then placed on top of the ceramic repair insert. The combined components (i.e., the CMC component being repaired, the ceramic repair insert, and the CMC face sheet) undergo a consolidation step to consolidate the components together. The consolidation step can be done by application of heat/vacuum/pressure inside an autoclave or outside of autoclave, heat/vacuum through the use of a vacuum apparatus like a vacuum bag and a furnace, or heat only. The combined components then undergo a pyrolysis/burnout step to burn the organic and pyrolysis the resin into carbon char. The combined components then undergo a densification process, such as a silicon melt-infiltration process in which some silicon or a silicon alloy is brought to infiltrate and densify the bond lines and CMC face sheet. The silicon or silicon alloy can be brought from an external source like a silicon ingot or directly from the pre-silicon-melt-infiltrated ceramic repair insert as the densified ceramic repair insert may contain enough excess silicon to infiltrate the bond lines and the CMC face sheets.

In another exemplary embodiment, a ceramic repair insert is melt-infiltrated prior to being inserted in a repair area of the CMC component, and the CMC face sheet is formed directly on top of the ceramic repair insert with the repair insert within the repair area. In such an embodiment, the ceramic repair insert is melt-infiltrated. Optionally, a bonding slurry is introduced on the surface of the CMC component that is going to receive the ceramic repair insert and the CMC face sheet and at the surface of the ceramic repair insert that is going to receive the CMC face sheet. The ceramic repair insert is placed in the repair area of the CMC component. One or more CMC plies are cut to shape to cover the top surface of the ceramic repair insert. The CMC plies are laid up one by one on top of each other directly on top of the ceramic repair insert residing within the repair area to form the CMC face sheet. The combined components (i.e., the CMC component being repaired, the ceramic repair insert, and the CMC face sheet) undergo a consolidation step to consolidate the components together. The consolidation step can be done by application of heat/vacuum/pressure inside an autoclave or outside of autoclave, heat/vacuum through the use of a vacuum apparatus like a vacuum bag and a furnace, or heat only. The combined components then undergo a pyrolysis/burnout step to burn the organic and pyrolysis the resin into carbon char. The combined components then undergo a silicon melt-infiltration process in which some silicon is brought to infiltrate and densify the bond lines and the CMC face sheet.

Thus, in various exemplary embodiments, the CMC face sheet can be laid up separately and thereafter be applied to the ceramic repair insert or be formed directly on top of the ceramic repair insert. The CMC face sheet can be consolidated before being placed on top of the ceramic repair insert or after it has been placed on top of the ceramic repair insert.

Figure 11:
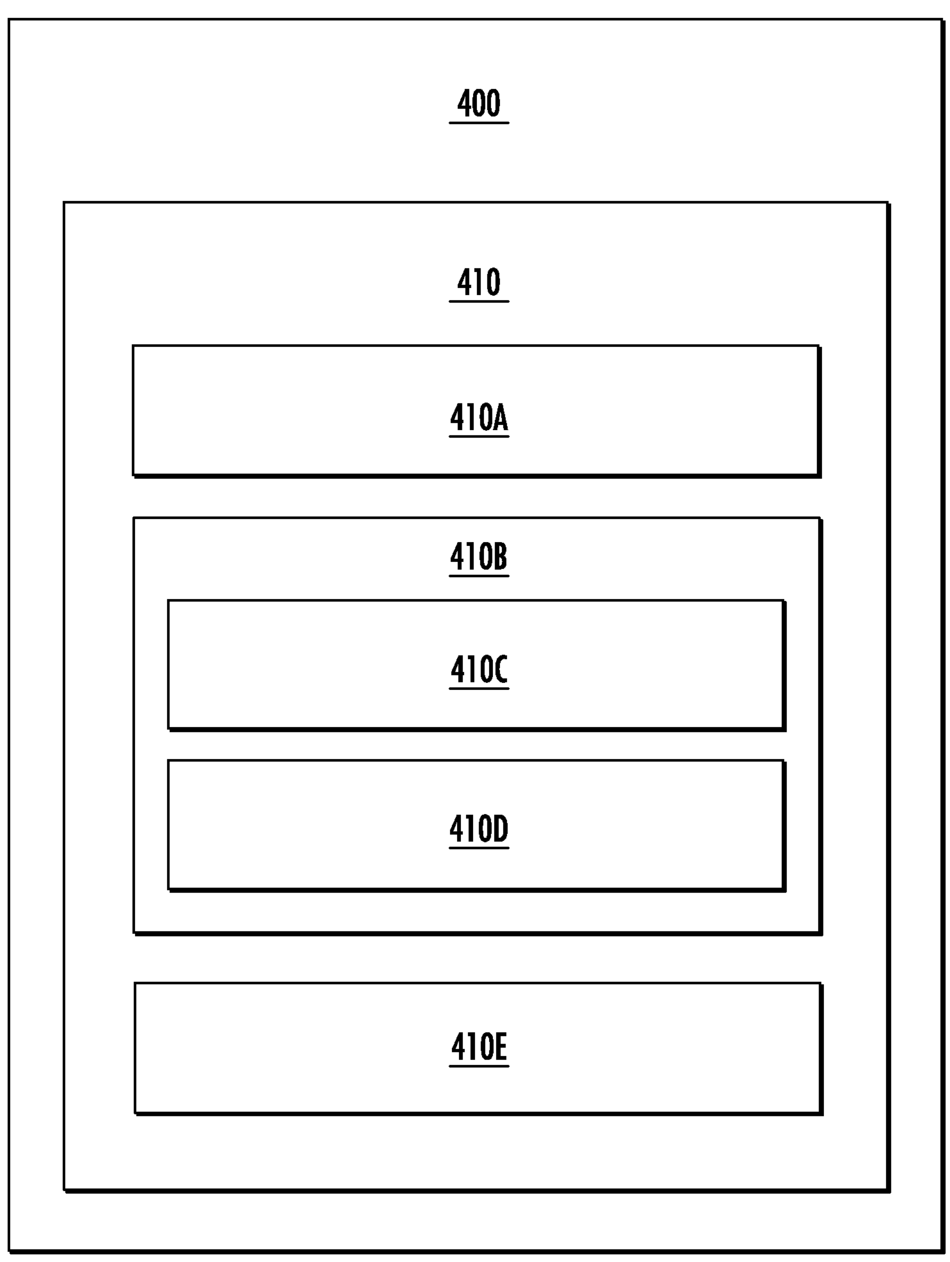
FIG. 11 is a block diagram of a computing system in accordance with various aspects of the present disclosure.

FIG. 11 depicts an example computing system 400 according to example embodiments of the present disclosure is depicted. The computing system 400 can be used, for example, to control various operations associated with the system 40 (FIG. 2) such as, but not limited to, controlling operation of the imaging device 42, acquiring or otherwise processing the three-dimensional repair data 44 (FIG. 2) corresponding to a repair area (e.g., such as the repair area 20 (FIGS. 2 and 3), the repair area 80 (FIG. 4), the repair area 212 (FIG. 5), the repair area 252 (FIG. 6), the repair area of the airfoil 280 (FIGS. 8A, 8B, and 9), or the repair area 302 (FIG. 10), and storing the repair data 44 (FIG. 2), and providing the repair data 44 (FIG. 2) to an additive manufacturing system to enable the additive manufacturing of the repair insert 50 (FIG. 3), the repair insert 90 (FIG. 4), the repair inserts 220, 222, 224, and 226 (FIG. 5), the repair insert 258 (FIG. 6), the repair insert 288 (FIG. 9), or the repair inserts 310 and 312 (FIG. 10). The computing system 400 can include one or more computing device(s) 410. The computing device(s) 410 can include one or more processor (s) 410A and one or more memory device(s) 410B. The one or more processor(s) 410A can include any suitable processing device, such as a microprocessor, microcontroller, integrated circuit, logic device, and/or other suitable processing device. The one or more memory device(s) 410B can include one or more computer-readable media, including, but not limited to, non-transitory computer-readable media, RAM, ROM, hard drives, flash drives, and/or other memory devices.

The one or more memory device(s) 410B can store information accessible by the one or more processor(s) 410A, such as the repair data 44 (FIG. 2), and including computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor (s) 410A to perform operations, such as any of the operations and functions for which the computing system 400 and/or the computing device(s) 410 are configured, the operations for operating the system 40 (FIG. 2), as described herein, and/or any other operations or functions of the one or more computing device(s) 410. Accordingly, the operations performed by the system 40 (FIG. 2) may be computer-implemented processes. The instructions 410C can be software written in any suitable programming language or can be implemented in hardware. Additionally, and/or alternatively, the instructions 310C can be executed in logically and/or virtually separate threads on processor(s) 410A. The memory device(s) 410B can further store data 410D that can be accessed by the processor(s) 410A. For example, the data 410D can include the repair data 44 (FIG. 2) indicative of the three-dimensional shape of a repair area and used or accessed for additively manufacturing the repair insert 50 (FIG. 3), the repair insert 90 (FIG. 4), the repair inserts 220, 222, 224, and 226 (FIG. 5), the repair insert 258 (FIG. 6), the repair insert 288 (FIG. 9) or the repair inserts 310 and 312 (FIG. 10).

The computing device(s) 410 can also include a network interface 410E used to communicate, for example, with the other components of system 400 (e.g., via a network). The network interface 410E can include any suitable components for interfacing with one or more network(s), including for example, transmitters, receivers, ports, controllers, antennas, and/or other suitable components. One or more external display devices (not depicted) can be configured to receive one or more commands from the computing device(s) 410.

Figure 12:
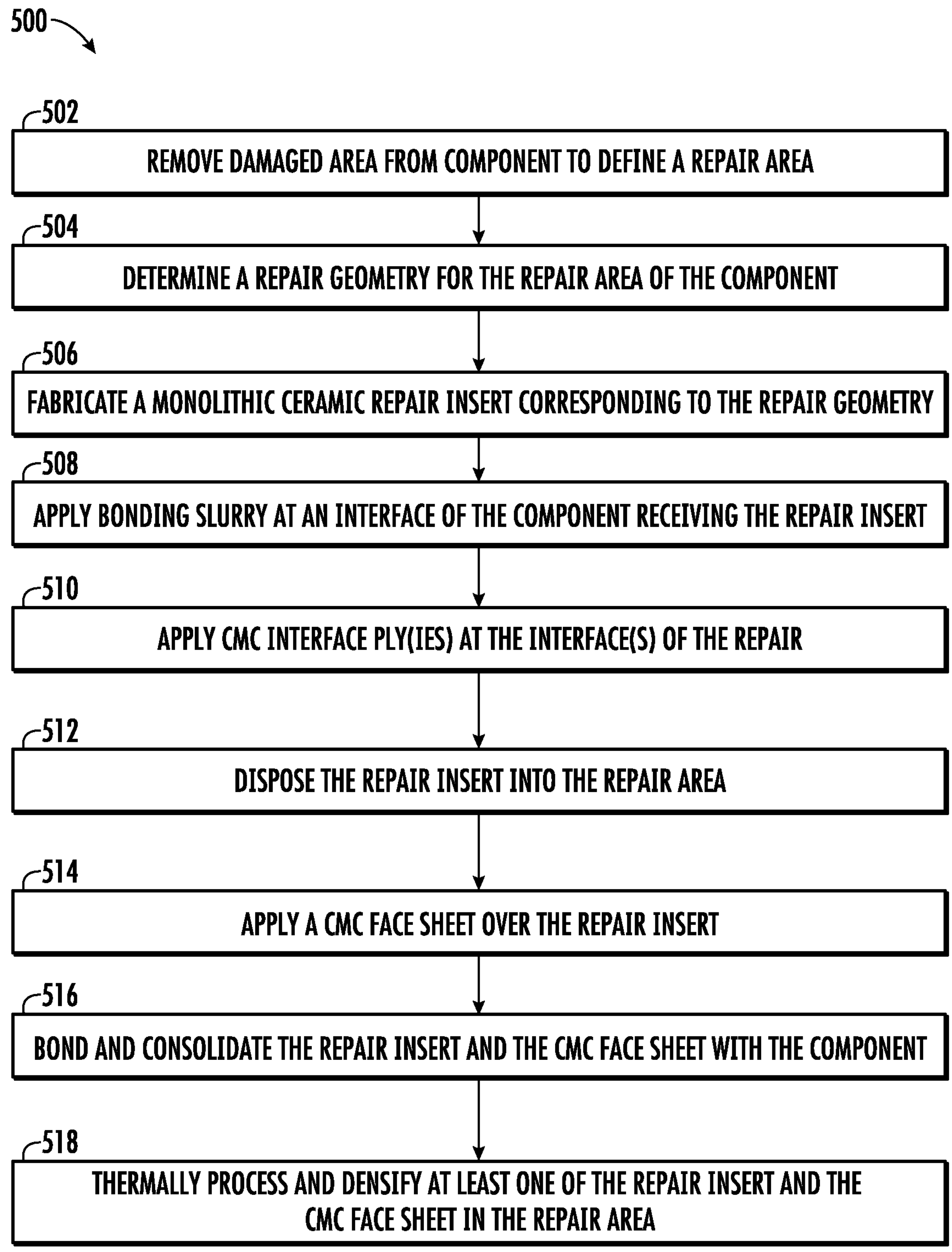
FIG. 12 is a block diagram depicting an embodiment of a method of repairing a ceramic composite component in accordance with various aspects of the present disclosure.

FIG. 12 provides a flow diagram of an exemplary method (500) for repairing a ceramic composites component in accordance with exemplary embodiments of the present disclosure. It should be appreciated that the method (500) is discussed herein only to describe exemplary aspects of the present subject matter and is not intended to be limiting.

At (502), the method (500) includes removing the damaged area from the component to define a repair area. At (504), the method (500) includes determining a repair geometry defined by the repair area. For example, a scanner or other type of imaging device may be used to obtain three-dimensional data corresponding to the repair area to define the repair geometry. At (506), the method (500) includes fabricating a monolithic ceramic repair insert corresponding to the repair geometry. For example, in exemplary embodiments, the method includes, at (506), additively manufacturing a monolithic repair insert corresponding to the repair geometry. At (508), the method (500) includes applying a bonding slurry at one or more interfaces corresponding to the repair area (e.g., an interface of the component receiving the repair insert, an interface of the repair area with the CMC face sheet, or an interface between the repair insert and the CMC face sheet).

At (510), the method (500) includes applying one or more CMC interface plies at one or more interfaces corresponding to the repair area (e.g., an interface of the component receiving the repair insert, an interface of the repair area with the CMC face sheet, or an interface between the repair insert and the CMC face sheet). It should be understood that in exemplary embodiments, (510) is optional. At (512), method (500) includes disposing the repair insert into the repair area. As described above, the repair insert may be densified prior to being inserted into the repair area. At (514), method (500) includes applying a CMC face sheet over the repair insert. At (514), the CMC face sheet may comprise one or more CMC plies placed above, on top of, or over one or more additional CMC plies. As described above, it should also be understood that (508), (510), or both, may be repeated (e.g., applying a bonding slurry, an interface ply, or both, at an interface of the component receiving the CMC face sheet or between the repair insert and the CMC face sheet). At (516), the method (500) includes bonding/consolidating the repair insert to the CMC face sheet, the repair insert to the component, and the CMC face sheet to the component. At (518), method (500) includes thermally processing and densifying at least one of the repair insert or the CMC face sheet in the repair area. As described above, the repair insert may be densified prior to being inserted into the repair area or after being inserted into the repair area.

Thus, embodiments of the present disclosure provide a method and technique for repairing a ceramic matrix composite component using a hybrid structural repair (e.g., a monolithic ceramic repair insert with a CMC face sheet). In exemplary embodiments, a non-sandwich CMC portion of the component is repaired utilizing a sandwich structure including a monolithic ceramic repair insert with a CMC face sheet. Exemplary embodiments of the present disclose utilize an additive manufacturing process to fabricate the repair insert to accommodate complex repair area shapes and tailor the repair insert to the specific repair geometry of the component. The repair insert may comprise a cellular or non-cellular repair insert. Additionally, the repair insert and CMC face sheet match or closely match the material properties of the component resulting in less residual stress due to coefficient of thermal expansion mismatch between the component and the repair insert or the component and the CMC face sheet and less differential shrinkage between the original component and the repair patch (monolithic ceramic insert and CMC face sheet) during utilization of the component at high temperatures, which is favorable for the thermomechanical properties of the repair components.

Additionally, in exemplary embodiments (e.g., as depicted in FIG. 2), a majority of the thickness of the repair area in the Z direction is occupied by the monolithic ceramic insert and a smaller portion is occupied by the CMC face sheet. During consolidation or densification of the monolithic ceramic insert and CMC face sheet, the shrinkage in the Z direction can be minimized since the shrinkage of the CMC face sheet is generally greater than the shrinkage of the ceramic insert.

In exemplary embodiments (e.g., as depicted in FIG. 2), a portion of the damaged CMC component is cut to remove a damaged or non-conforming portion. A ceramic insert is then inserted in the CMC component so as to at least partially restore the original shape of the CMC component. The junction between the original CMC component and the ceramic insert can be realized by a scarf joint, by common mechanical interlocking techniques commonly used in the woodworking joining field such as, by non-limiting examples, dovetail joints, dowelled joints, tenon joints, dowel tenon joints, bridle joints, and scarf joints, or both. In a subsequent step, one or more CMC plies are laid up on top of the ceramic insert with their orientation controlled in order to confer the desired mechanical properties. An adhesive layer in the form of a ceramic slurry, ceramic paste or ceramic tape can be inserted between the ceramic insert and the CMC plies in order to promote the adhesion between the CMC plies and the ceramic insert and between the repair insert/component and CMC plies/component. The bonding and densification of the ceramic insert and the CMC plies to each other and to the component is then conducted as previously described.

Further aspects are provided by the subject matter of the following clauses:

A method for repairing a component that comprises a ceramic matrix composite ("CMC") material, the method comprising: forming a repair insert defined by a repair geometry, wherein the repair geometry is based on a repair area of the component, wherein the repair insert comprises a monolithic ceramic; inserting the repair insert into the repair area; applying a CMC face sheet to the repair insert; bonding the repair insert to the CMC face sheet, the repair insert to the component, and the CMC face sheet to the component; and thermally processing and densifying at least one of the repair insert or the CMC face sheet in the repair area.

The method of the preceding clause, wherein forming the repair insert comprises additively manufacturing the repair insert.

The method of the preceding clause, wherein the repair insert comprises a solid monolithic ceramic.

The method of the preceding clause, wherein additively manufacturing the repair insert comprises additively manufacturing the repair insert of silicon carbide, and further comprising densifying the repair insert by silicon or a silicon alloy.

The method of any preceding clause, wherein forming the repair insert comprises machining the repair insert using the repair geometry.

The method of any preceding clause, further comprising applying at least one of a bonding slurry or a CMC interface ply to at least one of an interface of the repair area receiving the repair insert, an interface of the repair area with the CMC face sheet, or an interface between the repair insert and the CMC face sheet.

The method of any preceding clause, wherein applying the CMC face sheet comprises applying one or more CMC plies above one another to the repair insert before or after insertion of the repair insert into the repair area.

The method of any preceding clause, further comprising defining the repair geometry by performing at least one of scanning the repair area or creating a mold of the repair area.

The method of any preceding clause, further comprising grinding or cutting the component to define the repair area.

The method of any preceding clause, further comprising forming the repair insert comprising a cellular structure.

The method of any preceding clause, further comprising forming the repair insert comprising a honeycomb structure.

The method of any preceding clause, further comprising forming the repair insert of silicon carbide.

The method of any preceding clause, further comprising forming the repair insert from a grade of reaction bonded silicon carbide.

The method of any preceding clause, further comprising strapping together at least one cell of the repair insert to at least one cell of a cellular structure of the component using at least one CMC ply.

The method of any preceding clause, further comprising pre-consolidating one or more CMC plies to form the CMC face sheet.

The method of any preceding clause, further comprising forming the repair insert by bonding together a first repair insert and a second repair insert.

The method of any preceding clause, further comprising forming the repair insert by mechanically interlocking a first repair insert with a second repair insert.

The method of any preceding clause, further comprising densifying the repair insert prior to disposing the repair insert into the repair area.

The method of any preceding clause, further comprising forming the repair insert having an interlocking feature configured to engage a complementary interlocking feature formed on the component.

The method of any preceding clause, wherein inserting the repair insert into the repair area comprises inserting the repair insert into a non-sandwich CMC portion of the component.

The method of any preceding clause, wherein densifying at least one of the repair insert or the CMC face sheet comprises densifying by at least one of melt-infiltration, chemical vapor infiltration (CVI), or polymer impregnation and pyrolysis (PIP) in the repair area.

The method of any preceding clause, further comprising defining the repair area in a non-sandwich CMC portion of the component.

A method for repairing a component that comprises a ceramic matrix composite ("CMC") material, the method comprising: forming a repair insert defined by a repair geometry, wherein the repair geometry is based on a repair area of the component, wherein the repair insert comprises a monolithic ceramic; thermally processing and densifying the repair insert; inserting the repair insert into the repair area; applying a CMC face sheet to the repair insert; bonding the repair insert to the CMC face, the repair insert to the component, and the CMC face sheet to the component; and thermally processing and densifying the CMC face sheet.

The method of any preceding clause, wherein forming the repair insert comprises additively manufacturing the repair insert.

The method of any preceding clause, wherein forming the repair insert comprises machining the repair insert using the repair geometry.

The method of any preceding clause, further comprising applying at least one of a bonding slurry or a CMC interface ply to at least one of an interface of the repair area receiving the repair insert, an interface of the repair area with the CMC face sheet, or an interface between the repair insert and the CMC face sheet.

The method of any preceding clause, wherein applying the CMC face sheet comprises applying one or more CMC plies to the repair insert before or after insertion of the repair insert into the repair area.

The method of any preceding clause, further comprising defining the repair geometry by performing at least one of scanning the repair area or creating a mold of the repair area.

The method of any preceding clause, further comprising grinding or cutting the component to define the repair area.

The method of any preceding clause, further comprising forming the repair insert comprising a cellular structure.

The method of any preceding clause, further comprising strapping together at least one cell of the repair insert to at least one cell of a cellular structure of the component using at least one CMC ply.

A method for repairing a component that comprises a ceramic matrix composite ("CMC") material, the method comprising: defining a repair area of the component, the repair area disposed in a non-sandwich CMC portion of the component; forming a repair insert defined by a repair geometry, wherein the repair insert comprises a monolithic ceramic; inserting the repair insert into the repair area; applying a CMC face sheet to the repair insert; bonding the repair insert to the CMC face sheet, the repair insert to the component, and the CMC face sheet to the component; and thermally processing and densifying at least one of the repair insert or the CMC face sheet in the repair area.

The method of any preceding clause, further comprising scanning the repair area to define the repair geometry.

A method for repairing a component that comprises a ceramic matrix composite ("CMC") material, the method comprising: grinding or cutting the component to define a repair area, the repair area comprising a non-sandwich CMC portion of the component; forming a repair insert defined by a repair geometry, wherein the repair geometry is based on the repair area, wherein the repair insert comprises a monolithic ceramic; inserting the repair insert into the repair area; applying a CMC face sheet to the repair insert; bonding the repair insert to the CMC face sheet, the repair insert to the component, and the CMC face sheet to the component; and thermally processing and densifying at least one of the repair insert or the CMC face sheet in the repair area.

A ceramic matrix composite ("CMC") component, formed by the process of: determining a repair geometry for a repair area of the CMC component; inserting a repair insert into the repair area, wherein the repair insert comprises a monolithic ceramic; applying a CMC face sheet to the repair insert; bonding the repair insert to the CMC face sheet, the repair insert to the CMC component, and the CMC face sheet to the CMC component; and thermally processing and densifying at least one of the repair insert or the CMC face sheet in the repair area.

The CMC component of any preceding clause, wherein the process further comprises additively manufacturing the repair insert.

The CMC component of any preceding clause, wherein the process further comprises applying at least one of a bonding slurry or a CMC interface ply to at least one of an interface of the repair area receiving the repair insert or an interface of the repair area with the CMC face sheet.

The CMC component of any preceding clause, further comprising densifying the repair insert prior to disposing the repair insert into the repair area.

A method for repairing a component that comprises a ceramic matrix composite ("CMC") material, the method comprising: grinding or cutting the component to define a repair area, the repair area comprising a non-sandwich CMC portion of the component; forming a repair insert defined by a repair geometry, wherein the repair geometry is based on the repair area, wherein the repair insert comprises a CMC repair insert; thermally processing and densifying the CMC repair insert; inserting the thermally processed and densified CMC repair insert into the repair area; applying a CMC face sheet to the CMC repair insert; bonding the CMC repair insert to the CMC face sheet, the CMC repair insert to the component, and the CMC face sheet to the component; and thermally processing and densifying the CMC face sheet in the repair area.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for repairing a component that comprises a ceramic matrix composite ("CMC") material, the method comprising:

forming a repair insert defined by a repair geometry, wherein the repair geometry is based on a repair area of the component, wherein the repair insert comprises a monolithic ceramic;

inserting the repair insert into the repair area;

applying a CMC face sheet to the repair insert;

bonding the repair insert to the CMC face sheet, the repair insert to the component, and the CMC face sheet to the component; and thermally processing and densifying at least one of the repair insert or the CMC face sheet in the repair area.

2. The method of claim 1, wherein forming the repair insert comprises additive manufacturing the repair insert.

3. The method of claim 1, wherein densifying at least one of the repair insert or the CMC face sheet comprises densifying by at least one of melt-infiltration, chemical vapor infiltration (CVI), or polymer impregnation and pyrolysis (PIP) in the repair area.

4. The method of claim 1, further comprising applying at least one of a bonding slurry or a CMC interface ply to at least one of an interface of the repair area receiving the repair insert, an interface of the repair area with the CMC face sheet, or an interface between the repair insert and the CMC face sheet.

5. The method of claim 1, wherein applying the CMC face sheet comprises applying one or more CMC plies to the repair insert before or after insertion of the repair insert into the repair area.

6. The method of claim 1, further comprising defining the repair geometry by performing at least one of scanning the repair area or creating a mold of the repair area.

7. The method of claim 1, further comprising grinding or cutting the component to define the repair area.

8. The method of claim 1, wherein forming the repair insert comprises additively manufacturing the repair insert of silicon carbide, and wherein thermally processing and densifying by melt-infiltration comprises melt-infiltrating by silicon or a silicon alloy.

9. The method of claim 1, further comprising thermally processing and densifying the repair insert prior to inserting the repair insert into the repair area.

10. The method of claim 1, further comprising pre-consolidating one or more CMC plies to form the CMC face sheet.

11. The method of claim 1, further comprising forming the repair insert by bonding together a first repair insert and a second repair insert.

12. The method of claim 1, further comprising forming the repair insert by mechanically interlocking a first repair insert with a second repair insert.

13. The method of claim 1, further comprising forming the repair insert having an interlocking feature configured to engage a complementary interlocking feature formed on the component.

14. A method for repairing a component that comprises a ceramic matrix composite ("CMC") material, the method comprising:

defining a repair area of the component, the repair area disposed in a non-sandwich CMC portion of the component;

forming a repair insert defined by a repair geometry, wherein the repair geometry is based on the repair area, wherein the repair insert comprises a monolithic ceramic;

inserting the repair insert into the repair area;

applying a CMC face sheet to the repair insert;

bonding the repair insert to the CMC face sheet, the repair insert to the component, and the CMC face sheet to the component; and thermally processing and densifying at least one of the repair insert or the CMC face sheet in the repair area.

15. The method of claim 14, wherein forming the repair insert comprises additively manufacturing the repair insert.

16. The method of claim 14, further comprising applying at least one of a bonding slurry or a CMC ply to at least one of an interface of the repair area receiving the repair insert, an interface of the repair area with the CMC face sheet, or an interface between the repair insert and the CMC face sheet.

17. A ceramic matrix composite ("CMC") component, formed by a process of:

determining a repair geometry for a repair area of the CMC component;

inserting a preformed repair insert into the repair area, wherein the repair insert comprises a monolithic ceramic;

applying a CMC face sheet to the repair insert;

bonding the repair insert to the CMC face sheet, the repair insert to the CMC component, and the CMC face sheet to the CMC component; and thermally processing and densifying at least one of the repair insert or the CMC face sheet in the repair area.

18. The CMC component of claim 17, wherein the process further comprises applying at least one of a bonding slurry or a CMC interface ply to at least one of an interface of the repair area receiving the repair insert or an interface of the repair area with the CMC face sheet.

19. The CMC component of claim 17, wherein the process further comprises forming the repair insert having an interlocking feature configured to engage a complementary interlocking feature formed on the CMC component.

20. The CMC component of claim 17, wherein the process further comprises applying the CMC face sheet comprises applying one or more CMC plies to the repair insert before or after insertion of the repair insert into the repair area.

* * * * *